(12) United States Patent
Adams et al.

(10) Patent No.: US 10,601,796 B2
(45) Date of Patent: Mar. 24, 2020

(54) MANAGING PROGRAM CREDENTIALS ON ELECTRONIC DEVICES

(71) Applicant: Apple Inc., Cupertino, CA (US)

(72) Inventors: Christopher D. Adams, Cupertino, CA (US); Scott D. Blakesley, Sunnyvale, CA (US); Jack K. Chung, Cupertino, CA (US); George R. Dicker, Sunnyvale, CA (US); Glen W. Steele, San Jose, CA (US); Katherine B. Skinner, Cupertino, CA (US); Yousuf H. Vaid, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 151 days.

(21) Appl. No.: 15/462,301

(22) Filed: Mar. 17, 2017

(65) Prior Publication Data

US 2017/0272413 A1 Sep. 21, 2017

Related U.S. Application Data

(60) Provisional application No. 62/309,845, filed on Mar. 17, 2016, provisional application No. 62/348,962, filed on Jun. 12, 2016.

(51) Int. Cl.
*H04L 29/06* (2006.01)
*H04W 12/04* (2009.01)
(Continued)

(52) U.S. Cl.
CPC ............ *H04L 63/06* (2013.01); *H04L 63/061* (2013.01); *H04L 63/0823* (2013.01);
(Continued)

(58) Field of Classification Search
CPC . G06F 17/30; G06F 1/00; G06F 21/00; G06F 9/445; H04M 1/21; H04M 3/56;
(Continued)

(56) References Cited

U.S. PATENT DOCUMENTS

| 6,442,549 B1* | 8/2002 | Schneider | ............ G06Q 20/202 |
| 2005/0097328 A1* | 5/2005 | England | ................ G06F 9/4416 713/173 |

(Continued)

FOREIGN PATENT DOCUMENTS

WO 2013/072437 A1 5/2013

*Primary Examiner* — Thanhnga B Truong
(74) *Attorney, Agent, or Firm* — Morgan, Lewis & Bockius LLP

(57) ABSTRACT

Systems, methods, and computer-readable media for personalizing program credentials are provided. For example, a program credential (e.g., loyalty pass) associated with a program provider (e.g., an issuer) subsystem may be customized using personal data. The personal data can be collected from an electronic device before provisioning the customized program credential on the electronic device for use in a suitable transaction. However, such personal data may not be collected unless an administration entity subsystem is first able to validate the program provider subsystem. The administration entity subsystem can generate tracking data that may be used during the validation and/or provisioning in order to track when program credentials are personalized.

25 Claims, 10 Drawing Sheets

(51) Int. Cl.
*H04W 12/06* (2009.01)
*H04W 12/00* (2009.01)
*H04W 12/08* (2009.01)
*H04W 4/60* (2018.01)
*H04W 4/80* (2018.01)
*G06Q 30/02* (2012.01)

(52) U.S. Cl.
CPC ....... *H04W 12/0023* (2019.01); *H04W 12/04* (2013.01); *H04W 12/06* (2013.01); *H04W 12/0806* (2019.01); *G06Q 30/0226* (2013.01); *H04W 4/60* (2018.02); *H04W 4/80* (2018.02)

(58) Field of Classification Search
CPC ..... H04L 12/18; H04L 63/06; H04L 63/0823; H04L 63/061; H04W 12/06; H04W 12/04
USPC ........ 726/6; 455/416, 557; 713/173; 705/21; 709/201, 203, 217, 218; 707/999.1, 707/999.01, E17.005
See application file for complete search history.

(56) References Cited

U.S. PATENT DOCUMENTS

| | | | |
|---|---|---|---|
| 2009/0247222 A1* | 10/2009 | Bonnat | G06F 1/1613 455/557 |
| 2013/0152185 A1 | 6/2013 | Singh et al. | |
| 2014/0066015 A1 | 3/2014 | Aissi | |
| 2015/0153975 A1 | 6/2015 | Mori | |
| 2016/0088033 A1* | 3/2016 | Chen | H04L 65/403 455/416 |

* cited by examiner

WALLET/P.P. APP
"Enter/Edit/Submit This Personal Data"

319 —

321 — Name: A
323 — E-Mail: B
325 — Telephone: C
327 — Zip Code: D
329 — [Submit]

190c
FIG. 3C

WALLET/P.P. APP
"The New Generic Program Credential May Be Personalized. Would You Like To Personalize This Credential?"

313 —

315 — [Yes]
317 — [No]

190b
FIG. 3B

WALLET/P.P. APP
"The New Program Credential Has Been Successfully Added To Your Wallet"

WALLET/P.P. APP
"A New Generic Program Credential Has Been Received. Would You Like To Add This Credential To Your Wallet?"

307 —

309 — [Yes]
311 — [No]

190a
FIG. 3A

MANAGING PROGRAM CREDENTIALS ON ELECTRONIC DEVICES

CROSS-REFERENCE TO RELATED APPLICATIONS

This application claims the benefit of prior filed U.S. Provisional Patent Application No. 62/309,845, filed Mar. 17, 2016, and of prior filed U.S. Provisional Patent Application No. 62/348,962, filed Jun. 12, 2016, each of which is hereby incorporated by reference herein in its entirety.

TECHNICAL FIELD

This disclosure relates to managing program credentials on an electronic device, including to automatically personalizing, at least in part, program credentials, such as loyalty and/or membership passes, with personal user information.

BACKGROUND OF THE DISCLOSURE

Portable electronic devices (e.g., cellular telephones) may be provided with near field communication ("NFC") components for enabling contactless proximity-based communications with another entity, such as a program provider. Often, these communications are associated with transactions (e.g., data transactions or commercial transactions) that may be related to a loyalty program associated with the program provider. However, registration of a credential on the electronic device often requires the manual entry of a substantial amount of information.

SUMMARY OF THE DISCLOSURE

This document describes systems, methods, and computer-readable media for registering and personalizing program credentials.

As an example, a method, at an administration entity subsystem, may include receiving first data from an electronic device, wherein the first data includes program provider information indicative of a program provider subsystem, determining if the program provider subsystem is valid based on the program provider information, when the program provider subsystem is determined to be valid, associating tracking data with the program provider information in a data structure, transmitting second data to the electronic device, wherein the second data includes the tracking data, after transmitting the second data, receiving third data from the electronic device, wherein the third data includes program provider data, determining if the program provider data is in the data structure, and, when the program provider data is determined to be in the data structure, enabling personalization of a program provider credential on the electronic device.

As another example, a method, at a program provider subsystem, may include receiving registration request data from an electronic device, wherein the registration request data includes user personalization data and administration tracking data, based on the user personalization data, generating custom data for personalizing a program provider credential, signing the administration tracking data with a key, and transmitting registration response data to the electronic device, wherein the registration response data includes the custom data and the signed administration tracking data.

As yet another example, a method, at an electronic device, may include receiving program provider credential data from a program provider subsystem, determining if the program provider credential data includes first program provider credential information indicative of a generic program provider credential and second program provider credential information indicative of the customizability of the generic program provider credential, when the program provider credential data is determined to include the first program provider credential information and the second program provider credential information, transmitting validation request data to an administration entity subsystem, wherein the validation request data includes program provider information indicative of the program provider subsystem, after transmitting the validation request data, receiving validation response data from the administration entity subsystem, wherein the validation response data includes administration tracking data, determining if the validation response data is indicative of a successful validation, when the validation response data is determined to be indicative of a successful validation, transmitting registration request data to the program provider subsystem, wherein the registration request data includes user personalization data and the administration tracking data.

As yet another example, an electronic device may include a communications component, a memory component, and a processor component operative to receive program provider credential data from a program provider subsystem via the communications component, determine if the program provider credential data includes first program provider credential information indicative of a generic program provider credential and second program provider credential information indicative of the customizability of the generic program provider credential, when the program provider credential data is determined to include the first program provider credential information and the second program provider credential information, transmit validation request data via to an administration entity subsystem via the communications component, wherein the validation request data includes program provider information indicative of the program provider subsystem, after transmission of the validation request data, receive validation response data from the administration entity subsystem via the communications component, wherein the validation response data includes administration tracking data, determine if the validation response data is indicative of a successful validation, when the validation response data is determined to be indicative of a successful validation, transmit registration request data to the program provider subsystem via the communications component, wherein the registration request data includes user personalization data and the administration tracking data.

As yet another example, a non-transitory computer-readable storage medium may be provided for storing at least one program, the at least one program including instructions, which when executed by an electronic device, cause the electronic device to receive program provider credential data from a program provider subsystem, determine if the program provider credential data includes first program provider credential information indicative of a generic program provider credential and second program provider credential information indicative of the customizability of the generic program provider credential, when the program provider credential data is determined to include the first program provider credential information and the second program provider credential information, transmit validation request data via to an administration entity subsystem, wherein the validation request data includes program provider information indicative of the program provider subsystem, after transmission of the validation request data, receive validation response data from the administration entity subsystem, wherein the validation response data includes administration tracking data, determine if the validation response data is indicative of a successful validation, and, when the validation response data is determined to be indicative of a successful validation, transmit registration request data to the program provider subsystem, wherein the registration request data includes user personalization data and the administration tracking data.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 3A-3D are front views of screens of a graphical user interface of the electronic device of one or more of FIGS. 1-3 illustrating processes for personalizing program credentials;

DETAILED DESCRIPTION OF THE DISCLOSURE

A program provider credential (e.g., loyalty pass or other such enrollment credential) of a program provider subsystem (e.g., a subsystem that may be associated with a merchant or other suitable loyalty or enrollment provider entity) may be customized using personal data collected from or otherwise associated with the owner of an electronic device before provisioning the customized program credential on the electronic device for use (e.g., in any suitable transaction). Such personal data may not be collected unless an administration (or commercial or authorizing) entity subsystem is first able to validate the program provider (or program provider) subsystem. When the program provider ("PP") subsystem is validated, the administration entity subsystem may generate tracking data and provide that data to the electronic device prior to the electronic device sharing personal data with the program provider subsystem. When such tracking data is received by the electronic device, the device may then share personal data and the tracking data with the program provider subsystem. In response to receiving such data, the program provider subsystem may sign the tracking data using a program provider (or merchant) key that may be a shared secret between the program provider subsystem and the administration entity subsystem. The program provider subsystem may then provide the customized program credential as well as the signed tracking data to the electronic device. Before completing the provisioning of the customized program credential on the electronic device, the device may first share the signed tracking data with the administration entity subsystem in order to further validate the program provider subsystem (e.g., using the shared secret). Such further validation may enable the administration entity subsystem to track the rate of successful customizations of program credentials.

Figure 1:
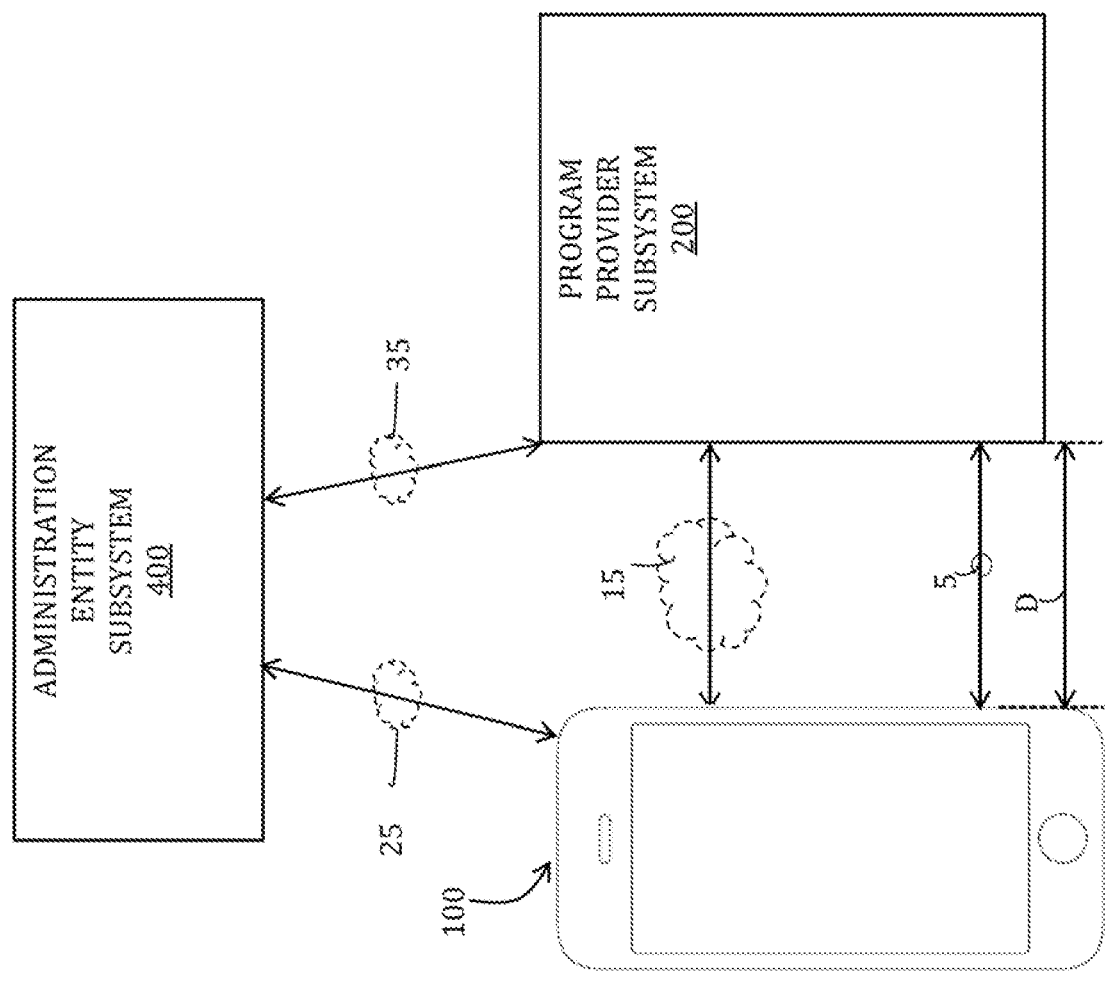
FIG. 1 is a schematic view of an illustrative system for personalizing program credentials.
Figure 1A:
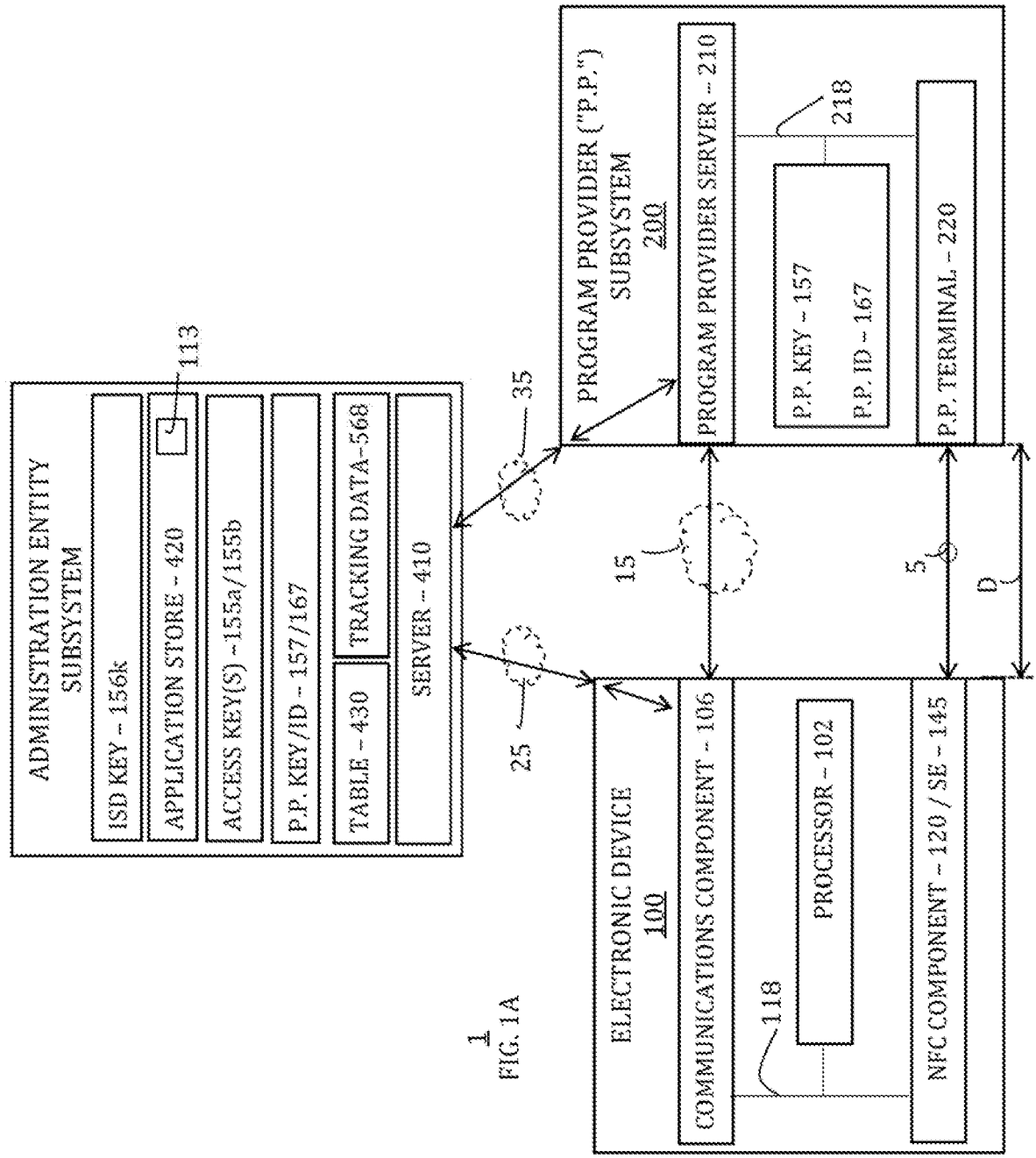
FIG. 1A is a more detailed schematic view of the illustrative system of FIG. 1.
Figure 2:
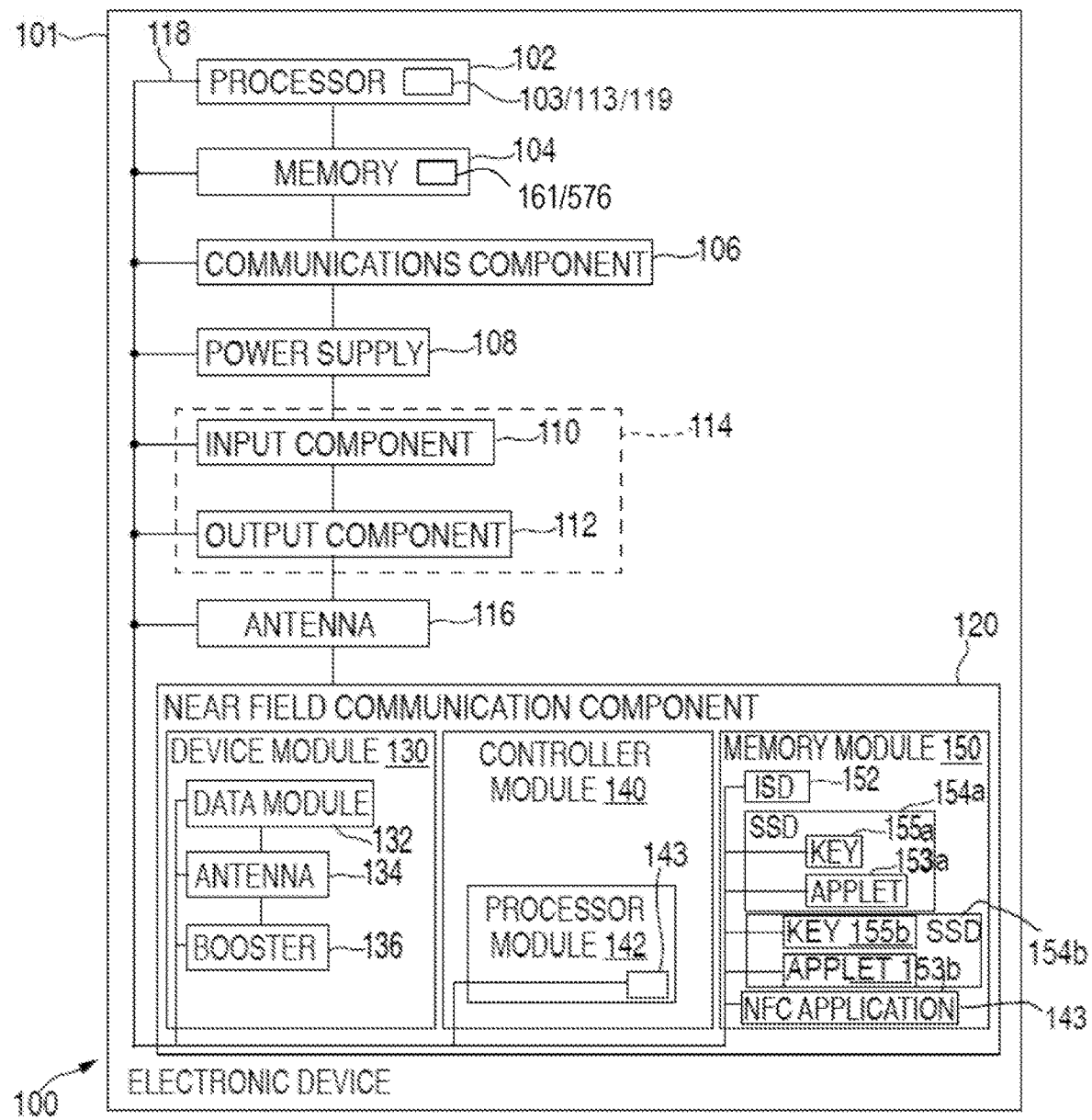
FIG. 2 is a more detailed schematic view of an example electronic device of the system of FIGS. 1 and 1A.
Figure 3:
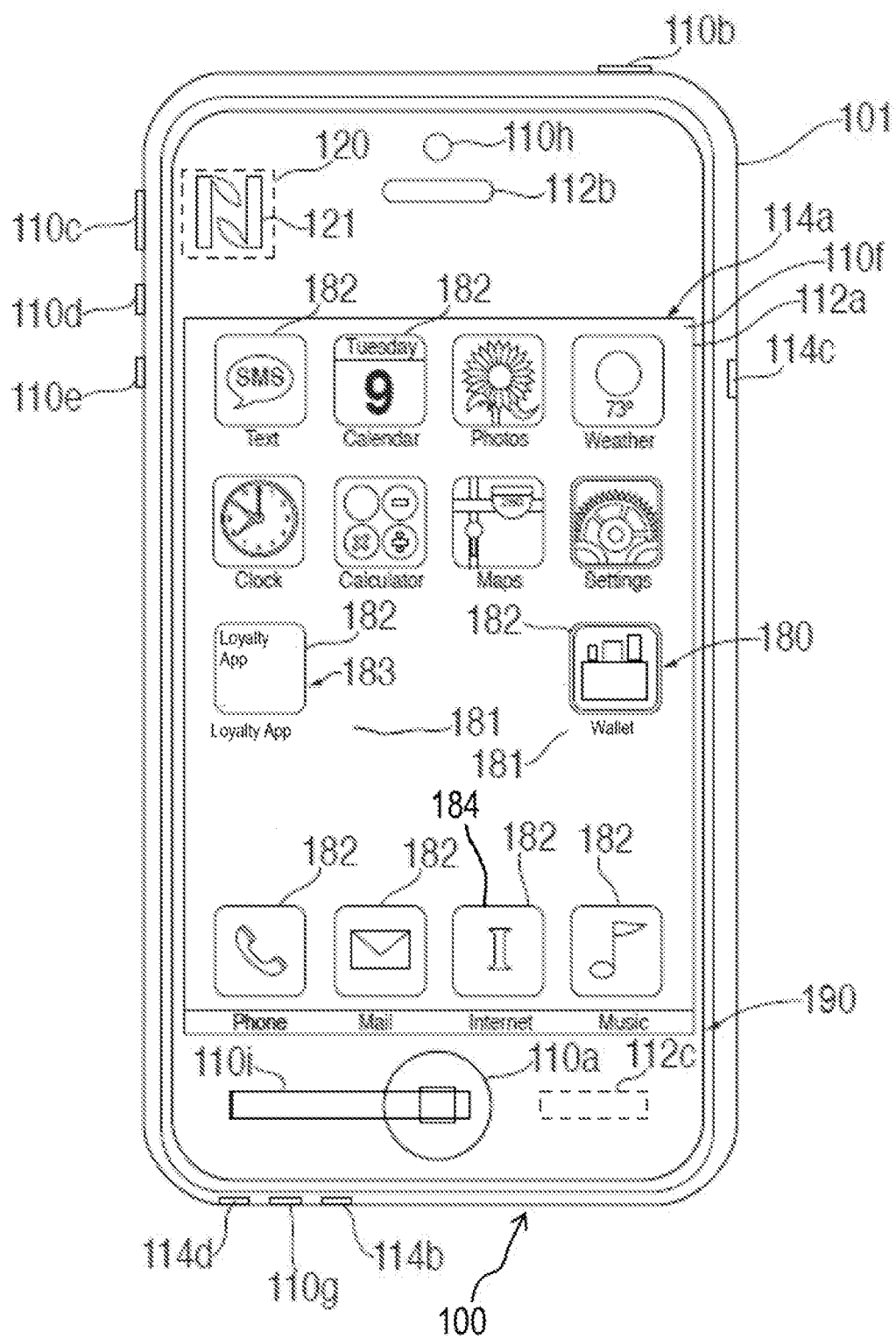
FIG. 3 is a front view of the example electronic device of FIGS. 1-2.
Figure 4:
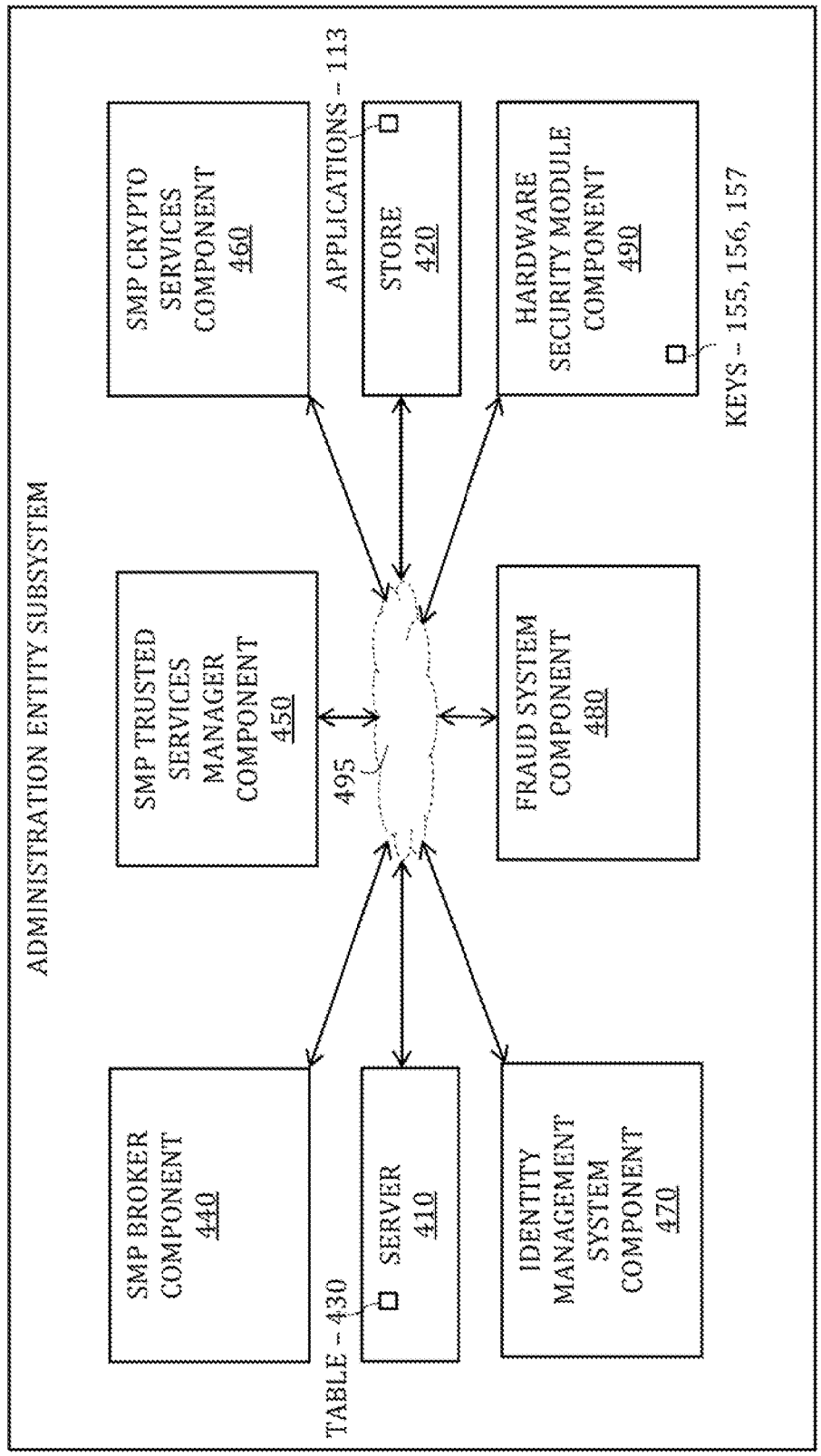
FIG. 4 is a more detailed schematic view of the example administration entity subsystem of the system of FIGS. 1 and 1A.

FIGS. 1 and 1A show a system 1 in which one or more program credentials (e.g., program provider credentials or loyalty passes or other such enrollment credentials) of a program provider subsystem 200 may be provisioned or registered onto an electronic device 100, either directly from program provider subsystem 200 or in conjunction with an administration entity subsystem 400 that may validate program provider subsystem 200 and/or a specific program credential for enabling personalization of a program credential with respect to a user of device 100, while FIGS. 2 and 3 show further details with respect to particular embodiments of electronic device 100 of system 1, FIGS. 3A-3D show example screens 190a-190d that may be representative of graphical user interfaces of electronic device 100 of system 1 during such program credential personalization, FIG. 4 shows further details with respect to particular embodiments of administration entity subsystem 400 of system 1, and FIGS. 5-8 are flowcharts of illustrative processes for personalizing program credentials.

Description of FIG. 1 and FIG. 1A

FIGS. 1 and 1A are schematic views of an illustrative system 1 that may allow for provisioning, registering, and/or personalizing one or more program credentials of program provider subsystem 200 on electronic device 100. A generic program provider credential (e.g., loyalty pass or other such enrollment credential) of a program provider subsystem 200 (e.g., a subsystem that may be associated with a program provider or other suitable loyalty or enrollment provider entity) may be received by electronic device 100 from program provider subsystem 200 via any suitable wired or wireless communication path 15 and/or via any suitable contactless proximity-based communication 5. Device 100 may then be configured to determine that such a received generic program provider credential (or merchant credential or loyalty credential or enrollment credential) is able to be personalized. After such a determination, but prior to sharing any suitable personalization information with program provider subsystem 200, device 100 may communicate with any suitable administration (or commercial or authorizing) entity subsystem 400 via any suitable wired or wireless communication path 25 to validate program provider subsystem 200 and/or to validate the particular generic program provider credential that may be personalized. Program provider validation by administration entity subsystem 400 may be at least partially enabled through registration and/or validation data communicated between administration entity subsystem 400 and program provider subsystem 200 via any suitable wired or wireless communication path 35. When program provider ("PP") subsystem 200 and/or a particular program provider credential is validated, administration entity subsystem 400 may generate tracking data and provide that data to electronic device 100 prior to electronic device 100 sharing personal data with program provider subsystem 200 for personalizing a program provider credential to be used on device 100. When such tracking data is received by electronic device 100, device 100 may then share personal data and the tracking data with program provider subsystem 200. In response to receiving such data, program provider subsystem 200 may sign the tracking data using a program provider (or merchant) key that may be a shared secret between program provider subsystem 200 and administration entity subsystem 400. Program provider subsystem 200 may then provide a customized program credential as well as the signed tracking data to electronic device 100. Before completing the provisioning of the customized program credential on electronic device 100, device 100 may first share the signed tracking data with administration entity subsystem 400 in order to further validate program provider subsystem 200 (e.g., using the shared secret). Such further validation may enable administration entity subsystem 400 to track the rate of successful customizations of program credentials.

System 1 may include communications path 15 for enabling communication (e.g., online-based communication) between electronic device 100 and program provider subsystem 200, communications path 25 for enabling communication between administration entity subsystem 400 and electronic device 100, and communications path 35 for enabling communication between administration entity subsystem 400 and program provider subsystem 200. One or more of paths 15, 25, and 35 may be at least partially managed by one or more trusted service managers ("TSMs"). Any suitable circuitry, device, system, or combination of these (e.g., a wired and/or wireless communications infrastructure that may include one or more communications towers, telecommunications servers, or the like) that may be operative to create a communications network may be used to provide one or more of paths 15, 25, and 35, which may be capable of providing communications using any suitable wired or wireless communications protocol. For example, one or more of paths 15, 25, and 35 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

As shown in FIG. 1A, for example, electronic device 100 may include a processor 102, a communications component 106, and/or a near field communication ("NFC") component 120. NFC component 120 may include or otherwise provide a secure element 145 that may be configured to provide a tamper-resistant platform (e.g., as a single-chip or multiple-chip secure microcontroller) that may be capable of securely hosting applications and their confidential and cryptographic data in accordance with rules and security requirements that may be set forth by a set of well-identified trusted authorities (e.g., an authority of a financial institution subsystem and/or an industry standard, such as GlobalPlatform). As described below in more detail, any suitable credential, such as a program provider credential and/or a payment credential, may be stored in an applet on secure element 145 (e.g., of NFC component 120) of device 100 and may be configured to provide credential data for use in a suitable transaction with a remote entity subsystem, such as program provider subsystem 200 or a financial institution subsystem (e.g., a banking institution (not shown)), where the credential data may provide sufficient detail for identifying an account associated with that remote entity subsystem. For example, a program provider credential may be stored in a program provider credential applet or a program provider credential application or a program provider credential pass on secure element 145 or in another suitable memory component (e.g., memory component 104) of device 100 and may be configured to provide program provider credential data as program provider credential transaction data with sufficient detail for identifying a particular program provider account or loyalty account or enrollment account or a generic and/or anonymous program provider card or other loyalty element, where such program provider credential data may be used by device 100 in one or more communications with program provider subsystem 200 for facilitating a transaction that may benefit or otherwise be affected by the program provider credential data (e.g., 5% off all purchases with the program provider for a generic loyalty card or accrual of frequent flier miles for a particular frequent flier loyalty account of a particular user when a transaction is made with the program provider).

NFC component 120 may be configured to communicate such credential data as a contactless proximity-based communication 5 (e.g., near field communication) with program provider subsystem 200 (e.g., with a program provider terminal 220 of program provider subsystem 200, which may be located at a brick and mortar store or any physical location at which a user of device 100 may use one or more program provider credentials stored on device 100 to conduct a transaction with a proximately located program provider terminal 220 via a contactless proximity-based communication). Alternatively, or additionally, communications component 106 may be provided to allow device 100 to communicate any suitable program provider credential data (e.g., as an online-based communication) with one or more other electronic devices or servers or subsystems (e.g., one or more subsystems or other components of system 1, such as with program provider server 210 of program provider subsystem 200 via any suitable online communication) using any suitable wired or wireless protocol (e.g., via communications path 15, 25, and/or 35). Processor 102 of device 100 may include any processing circuitry that may be operative to control the operations and performance of one or more components of device 100. For example, processor 102 may be configured to run one or more applications on device 100 (e.g., a device application 103 and/or an online resource or program provider application 113) that may at least partially dictate the way in which data (e.g., payment and/or loyalty credential data of any suitable transaction data) may be communicated by device 100 for funding or otherwise carrying out a transaction with program provider subsystem 200. Moreover, device 100 may include any suitable device identification information or device identifier, which may be accessible to processor 102 or any other suitable portion of device 100 (e.g., device identifier information 119 of FIG. 2). Any suitable device identification information may be utilized by administration entity subsystem 400 and/or program provider subsystem 200 for uniquely identifying device 100 to facilitate a transaction with program provider subsystem 200 and/or to enable any suitable secure communication with device 100. As just one example, device identification information may be a telephone number or e-mail address or any unique identifier that may be associated with device 100.

Program provider subsystem 200 may include any suitable program provider server 210, as shown in FIG. 1A, which may include any suitable component or subsystem that may be configured to communicate any suitable data via any suitable communications protocol (e.g., Wi-Fi, Bluetooth™, cellular, wired network protocols, etc.) with a communications component of administration entity subsystem 400 (e.g., via communications path 35) and/or with a communications component 106 of device 100 (e.g., via communications path 15). For example, program provider server 210 may be operative to communicate device transaction data 590 of process 500 of FIG. 5 with communications component 106 of device 100 within any suitable online-context, such as when a user of device 100 is communicating with program provider server 210 to conduct a transaction via any suitable program provider online resource 113 that may be running on device 100, such as a third party program provider application 113 running on device 100 that may be managed by program provider server 210 (e.g., a native application) or an internet application 113 (e Safari™ by Apple Inc.) running on device 100 that may be pointed to a uniform resource locator ("URL") whose target or web resource may be managed by program provider server 210 (e.g., a program provider website, a program provider application using a webview directed to a program provider website (e.g., an internet browser bundled inside a program provider application, thereby producing what may be referred to as a hybrid app, which may enable such an app to be built using web technologies (e.g., HTML, JavaScript, CSS, etc.) but still may enable such an app to be packaged as a native app), and/or a non-program provider application using a webview directed to a program provider website). Accordingly, it is noted that communications between program provider server 210 and device 100 may occur wirelessly and/or via wired paths (e.g., over the internet). Program provider server 210 may be provided by a program provider of program provider subsystem 200 (e.g., as a webserver to host website data and/or manage third party application data). Additionally, or alternatively, as shown in FIG. 1A, program provider subsystem 200 may include any suitable program provider terminal 220 (e.g., a program provider check-in or payment terminal), which may include any suitable component or subsystem that may be configured to communicate any suitable data with a contactless proximity-based communication component of device 100 (e.g., as a contactless proximity-based communication 5 with NFC component 120 of device 100). Moreover, as shown in FIG. 1A, program provider subsystem 200 may include a program provider key 157 and/or a program provider identifier ("ID") 167. Although not shown, program provider subsystem 200 may also include a program provider processor component that may be the same as or similar to a processor component 102 of electronic device 100 of FIGS. 1A and 2, a program provider communications component that may be the same as or similar to a communications component 106 of electronic device 100 of FIGS. 1A and 2 (e.g., as a portion of server 210), a program provider I/O interface that may be the same as or similar to an I/O interface 114 of electronic device 100 of FIG. 2, a program provider bus 218 that may be the same as or similar to a bus 118 of electronic device 100 of FIGS. 1A and 2, a program provider memory component that may be the same as or similar to a memory component 104 of electronic device 100 of FIG. 2, and/or a program provider power supply component that may be the same as or similar to a power supply component 108 of electronic device 100 of FIG. 2.

Program provider subsystem 200 may be managed or otherwise at least partially controlled or operated by any suitable entity that may manage any suitable loyalty and/or enrollment and/or membership program with one or more users (e.g., a user of device 100), which, in some embodiments, may also sell, rent, and/or otherwise provide any suitable goods and/or services to such users (e.g., airlines, hotels, retail stores, clubs, etc.). A specific program provider credential applet of NFC component 120 of device 100 and/or a specific program provider credential data structure of memory component 104 of device 100 may be associated with a specific program provider credential that may be generic for all users (e.g., an anonymous loyalty credential that may provide a standard discount and/or accrue generic loyalty points (e.g., track purchase of ten ice cream cones such that an eleventh ice cream cone is free)) and/or that may be personalized for a specific user and electronically linked to an account or accounts of a particular user with program provider subsystem 200 (e.g., a personalized loyalty credential that may be registered to a particular user for accruing specific loyalty points and/or for receiving special offers (e.g., track frequent flier miles for a particular user's frequent flier account with a particular airline program provider subsystem)). Various types of program provider credentials or loyalty passes or loyalty cards or loyalty accounts may be associated with any suitable type of physical card and/or digital account, with or without an associated physical card, that may be maintained for a user, including, but not limited to, rewards cards/accounts, points cards/accounts, advantage cards/accounts, club cards/accounts, member cards/accounts, disloyalty cards/accounts, gift cards/accounts, stamp cards/accounts, class cards/accounts, private label account cards/accounts, reloadable prepaid account cards/accounts, non-reloadable prepaid account cards/accounts, punch cards/accounts, stored value cards/accounts, digital representations of the same, and the like. A program provider credential may be provisioned on device 100 (e.g., as a program provider credential of a credential supplemental security domain of NFC component 120 and/or as a program provider credential of memory component 104, as described below) by program provider subsystem 200 for later use in a credential data communication (e.g., a contactless proximity-based communication and/or an online-based communication) with program provider subsystem 200 (e.g., directly or via administration entity subsystem 400). Each program provider credential may be a specific brand of loyalty card that may be branded by program provider subsystem 200.

Although not shown, system 1 may include a financial institution subsystem (e.g., a subsystem that may include a payment network subsystem (e.g., a payment card association or a credit card association) and/or an issuing bank subsystem), where one or more specific payment credential applets of NFC component 120 of device 100 may be associated with a specific payment credential that may be electronically linked to an account or accounts of a particular user with the financial institution subsystem (e.g., accounts for various types of payment cards may include credit cards, debit cards, charge cards, stored-value cards (e.g., transit cards), fleet cards, gift cards, and the like). Such a payment credential may be provisioned on device 100 (e.g., as a payment credential of a payment credential supplemental security domain of NFC component 120) by such a financial institution subsystem (e.g., via administration entity subsystem 400) and may later be used by device 100 as at least a portion of a transaction with program provider subsystem 200 (e.g., to pay for a good or service in coordination with a specific loyalty account with that program provider (e.g., a user of device 100 may pay program provider subsystem 200 for a plane ticket with a payment credential while also using a program provider credential to get frequent flier mile credit for that purchase)).

In order for a transaction to occur within system 1, at least one credential (e.g., a program provider credential and/or a payment credential) may be provisioned on device 100 (e.g., on secure element 145 of electronic device 100 (e.g., as credential information of an applet 153) and/or on any other suitable memory portion (e.g., memory component 104 (e.g., as credential information 161 (e.g., credential response data and/or custom data 576 of process 500))) of electronic device 100). For example, such a credential may be at least partially provisioned in memory 104 of device 100 directly from program provider subsystem 200 (e.g., via communications path 15 or as a communication 5 between program provider subsystem 200 and device 100) or on secure element 145 (e.g., via administration entity subsystem 400). Any suitable credential data may be provisioned on secure element 145 of device 100 as at least a portion or all of a credential supplemental security domain of the secure element and may include a credential applet with credential information and/or a credential key, such as credential application or credential applet 153*a* with credential information and credential key 155*a*. As one example, a financial institution subsystem (not shown) may generate at least a portion of credential data for a security domain of secure element 145 for provisioning a payment credential on device 100 and may be responsible for management of credential key 155*a*, which may include the generation, exchange, storage, use, and replacement of such a key (e.g., public and private key set for enabling a shared secret between device 100 and that remote subsystem for use in secure communications therebetween). It is to be understood that a credential key 155*a* of device 100 and of a remote subsystem may be any suitable shared secret (e.g., a password, passphrase, array of randomly chosen bytes, one or more symmetric keys, public-private keys (e.g., asymmetric keys), etc.) available to both the secure element of electronic device 100 and the remote subsystem that may be operative to enable any suitable crypto data (e.g., a cryptogram) or any other suitable data to be independently generated by electronic device 100 and the remote subsystem (e.g., for validating payment data for a transaction), such as by using any suitable cryptographic algorithm or cipher whose functional output may be at least partially determined by the shared secret, where such a shared secret may be provisioned on device 100 by the remote subsystem. A shared secret may either be shared beforehand between the remote subsystem and device 100 (e.g., during provisioning of a credential on device 100 by the remote subsystem), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100.

Administration entity subsystem 400 may be provided as an intermediary between device 100 and program provider subsystem 200 and/or any other remote subsystem (e.g., a financial institution subsystem), where administration entity subsystem 400 may be configured to provide a new layer of security and/or to provide a more seamless user experience when a credential is being provisioned on device 100 and/or when such a provisioned credential is being used as part of a credential data communication between device 100 and program provider subsystem 200. Administration entity subsystem 400 may be provided by a specific administration entity that may offer various services to a user of device 100 via user-specific log-in information to a user-specific account with that administration entity (e.g., via user-specific identification and password combinations). As just one example, administration entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, the Apple iMessage™ Service for communicating media messages between devices, etc.), and which may also be a provider, manufacturer, and/or developer of device 100 itself (e.g., when device 100 is an iPod™, iPad™, iPhone™, or the like) and/or of an operating system (e.g., device application 103) of device 100. The administration entity that may provide administration entity subsystem 400 (e.g., Apple Inc.) may be distinct and independent from any financial entity of any remote financial institution subsystem. For example, the administration entity that may provide administration entity subsystem 400 may be distinct and/or independent from any payment network or issuing bank that may furnish and/or manage any credit card or any other payment credential to be provisioned on end-user device 100. Additionally, or alternatively, the administration entity that may provide administration entity subsystem 400 (e.g., Apple Inc.) may be distinct and independent from any program provider of program provider subsystem 200 that may furnish and/or manage any loyalty credential to be provisioned on end-user device 100. For example, the administration entity that may provide administration entity subsystem 400 may be distinct and/or independent from any program provider of program provider subsystem 200 that may provide a program provider terminal for contactless proximity-based communications, a third party application or online resource 113 for online communications, and/or any other aspect of program provider subsystem 200. Such an administration entity may leverage its potential ability to configure or control various components of device 100 (e.g., software and/or hardware components of device 100, such as when that administration entity may at least partially produce or manage device 100) in order to provide a more seamless user experience for a user of device 100 when he or she wants to provision a credential offered by program provider subsystem 200 or any other remote subsystem on device 100 and/or when such a provisioned credential is being used as part of a credential data communication with program provider subsystem 200 to carry out a transaction. For example, in some embodiments, device 100 may be configured to communicate with administration entity subsystem 400 seamlessly and transparently to a user of device 100 (e.g., via communications path 25) for sharing and/or receiving certain data that may enable a higher level of security (e.g., during provisioning of credential data on device 100 and/or during an online-based secure data communication between device 100 and program provider subsystem 200). Although not shown, administration entity subsystem 400 may also include a processor component that may be the same as or similar to processor component 102 of electronic device 100 of FIGS. 1 and 2, a communications component that may be the same as or similar to communications component 106 of electronic device 100 of FIGS. 1 and 2, an I/O interface that may be the same as or similar to I/O interface 114 of electronic device 100 of FIG. 2, a bus that may be the same as or similar to bus 118 of electronic device 100 of FIG. 2, a memory component that may be the same as or similar to memory component 104 of electronic device 100 of FIG. 2, and/or a power supply component that may be the same as or similar to power supply component 108 of electronic device 100 of FIG. 2, one, some or all of which may be at least partially provided by server 410.

In addition to at least one credential being provisioned on secure element 145 (e.g., as a portion of a credential SSD 154) or memory component 104 (e.g., as credential information 161), at least one access SSD with an access key 155*b* may also be provisioned on secure element 145 or memory component 104 of device 100 in order to more securely enable device 100 to conduct a transaction with program provider subsystem 200. For example, access data, such as an access SSD, may be at least partially provisioned on device 100 directly from administration entity subsystem 400 (e.g., via communications path 25 between server 410 of administration entity subsystem 400 and communications component 106 of device 100, which may then be passed to memory 104 or secure element 145 from communications component 106). Access data may be provisioned on device 100 as at least a portion or all of an access SSD and may include an access applet 153*b* with an access key 155*b*. As shown in FIG. 1A, administration entity subsystem 400 may also have access to access key 155*b* (e.g., for decrypting data encrypted by device 100 using access key 155*b*). Administration entity subsystem 400 may be responsible for management of access key 155*b*, which may include the generation, exchange, storaue, use, and replacement of such a key. Administration entity subsystem 400 may store its version of access key 155*b* in a secure element of administration entity subsystem 400. An access SSD of device 100 with access key 155*b* may be configured to determine intent and local authentication of a user of device 100 (e.g., via one or more input components 110 of device 100, such as a biometric input component) and, in response to such a determination, may be configured to enable another particular SSD for conducting a transaction (e.g., with a payment and/or loyalty credential of a credential SSD of device 100). By storing such an access SSD on device 100, its ability to reliably determine user intent for and authentication of a transaction may be increased. Moreover, access key 155*b* of such an access SSD of device 100 may be leveraged to provide increased encryption to transaction data that may be communicated outside of the secure element of device 100 or outside of device 100 itself. Additionally, or alternatively, such access data may include an issuer security domain ("ISD") key 156*k* for an ISD 152 of electronic device 100, which may also be maintained by administration entity subsystem 400, and may be used in addition to or as an alternative to access key 155*b*.

A program provider application or online resource 113 may be accessed by device 100 in order to enable an online transaction (e.g., data transaction, commercial transaction, purchase transaction, financial transaction, etc.) to be facilitated between device 100 and program provider subsystem 200 or to enable online access to any other suitable secure device functionality of device 100 by program provider subsystem 200. First, such an application 113 may be approved or registered or otherwise enabled by administration entity subsystem 400 before application 113 may be effectively utilized by device 100. For example, an application store 420 of administration entity subsystem 400 (e.g., the Apple App Store™) may receive at least some data representative of application 113 from program provider subsystem 200 via communications path 35. Moreover, in some embodiments, administration entity subsystem 400 may generate or otherwise assign a program provider key 157 for application 113 and may provide such a program provider key 157 to program provider subsystem 200 (e.g., via path 35). Alternatively, program provider subsystem 200 may generate or otherwise assign a program provider key 157 for application 113 and may provide such a program provider key 157 to administration entity subsystem 400 (e.g., via path 35). Either program provider subsystem 200 or administration entity subsystem 400 may be responsible for management of program provider key 157, which may include the generation, exchange, storage, use, and replacement of such a key. No matter how or where such a program provider key 157 may be generated and/or managed, both program provider subsystem 200 and administration entity subsystem 400 may store a version of program provider key 157 (e.g., in a respective secure element of program provider subsystem 200 and administration entity subsystem 400, where, in some embodiments, the program provider key 157 stored by program provider subsystem 200 may be a private key and the program provider key 157 stored by administration entity subsystem 400 may be a corresponding public key (e.g., for use in asymmetric key encryption/decryption processes)). In some embodiments, such a program provider key 157 may be specifically associated with a program provider application 113 and/or with a program provider credential (e.g., a loyalty pass credential), while, in other embodiments, program provider key 157 may be specifically associated with a program provider of program provider subsystem 200 such that program provider key 157 may be associated with multiple third party applications or web resources or loyalty credentials of the same program provider of program provider subsystem 200. A unique program provider identifier 167 may be generated and/or otherwise assigned to or associated with an application 113 and/or a program provider loyalty pass by administration entity subsystem 400 and/or by program provider subsystem 200. For example, a program provider (or merchant) identifier 167 may be an alphanumeric string, a domain (e.g., a URL or otherwise for a web resource type online resource application 113), or any other suitable identifier that may uniquely identify a program provider and/or a particular program provider online resource and/or a particular program provider loyalty pass (e.g., uniquely identify such to administration entity subsystem 400). A table 430 or any other suitable data structure or source of information that may be accessible to administration entity subsystem 400 may be provided for associating a particular program provider key 157 with a particular program provider identifier 167 of a program provider application 113 or program provider loyalty pass or program provider entity. A program provider online resource may be associated with a particular program provider identifier 167 and a particular program provider key 157, each of which may be securely shared between program provider subsystem 200 and administration entity subsystem 400. Table 430 may enable administration entity subsystem 400 to determine and utilize an appropriate program provider key 157 for providing a layer of security to any secure device data communicated to program provider subsystem 200 (e.g., credential data that may include payment credential data and/or loyalty credential data native to device 100) for a transaction that may involve device 100 interfacing with program provider subsystem 200 via program provider application 113 associated with key 157 and program provider identifier 167. Device 100 may be configured to access application 113 (e.g., from application store 420 via communications path 25) and run application 113 (e.g., with processor 102). Alternatively, or additionally, a program provider key 157 and program provider identifier 167 may be associated with a program provider's website (e.g., one or more URLs or domains, which may be referred to herein as a program provider online resource or program provider application in some embodiments) or with the program provider generally, rather than or in addition to a program provider's third party native app. For example, a program provider of program provider subsystem 200 may work with administration entity subsystem 400 to associate a particular program provider website or the program provider generally with a particular program provider key 157 and program provider identifier 167 within table 430, which may enable administration entity subsystem 400 to determine and utilize an appropriate program provider key 157 for providing a layer of security to any secure device data communicated to program provider subsystem 200 (e.g., commerce credential data that may include credential data native to device 100) for a transaction that may involve device 100 interfacing with program provider server 210 to conduct a transaction via an internet application or web browser miming on device 100 that may be pointed to a URL or domain whose target or web resource may be associated with that program provider key 157 and program provider identifier 167 (e.g., the unique domain of that web resource (e.g., store.program.provider.com)). Device 100 may be configured to access such a URL, for example, from program provider server 210 via communication path 15 (e.g., using an internet application 113 on device 100 that may be considered a program provider online resource when targeting such a program provider web resource). In other embodiments, an application 113 may not be associated with a specific program provider, program provider subsystem 200, program provider key 157 and/or program provider identifier 167, but instead may be an independent application available to device 100 with a webview targeting such a program provider web resource, thereby acting as a program provider online resource. Such a registration of a program provider online resource by administration entity subsystem 400 (e.g., secure and validated sharing of program provider key 157 and program provider identifier 167 between program provider subsystem 200 and administration entity subsystem 400 (e.g., for storage in table 430)) may be carried out in any suitable manner to ensure administration entity subsystem 400 that program provider subsystem 200 is a valid owner of the online resource. Therefore, a program provider online resource (e.g., native app, domain/URL, or any other suitable web resource, or perhaps even a program provider terminal) and/or a program provider loyalty pass may be associated with a particular program provider identifier 167 and at least one particular program provider key 157 (e.g., during registration at step 502 of process 500 of FIG. 5), each of which may be securely shared between program provider subsystem 200 and administration entity subsystem 400 in any suitable manner and such an association may be accessible to administration entity subsystem 400 (e.g., in table 430).

Description of FIG. 2

Referring now to FIG. 2, FIG. 2 shows a more detailed view of electronic device 100 of system 1 described above with respect to FIG. 1. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not shown in FIG. 2. For example, electronic device 100 may include any other suitable components or several instances of the components (e.g., antennas) shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a touch of a display screen and that may also output visual information via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application or any other suitable online resource (e.g., an application associated with a program provider of program provider subsystem 200). Moreover, processor 102 may have access to device identification information 119, which may be utilized by a user of device 100 and/or administration entity subsystem 400 for providing identification of device 100.

NFC component 120 may be any suitable proximity-based communication mechanism that may enable contactless proximity-based transactions or communications between electronic device 100 and a program provider terminal (e.g., program provider payment terminal 220) of program provider subsystem 200. NFC component 120 may include any suitable modules for enabling contactless proximity-based communication between electronic device 100 and such a program provider terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a program provider terminal as part of a contactless proximity-based or NFC communication. Additionally, or alternatively, NFC data module 132 may be configured to contain, route, or otherwise receive any suitable data that may be received by NFC component 120 from a program provider terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a program provider terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and program provider subsystem 200. NFC memory module 150 may be tamper resistant and may provide at least a portion of a secure element 145. For example, such a secure element may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing remote subsystem (e.g., a financial institution subsystem) may store keys and/or other suitable information for creating or otherwise provisioning one or more credentials (e.g., credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A credential may include credential data (e.g., credential information) that may be assigned to a user/consumer and that may be stored securely on electronic device 100, such as a credit card payment number (e.g., a device primary account number ("DPAN"), DPAN expiry date, CVV, etc. (e.g., as a token or otherwise)). NFC memory module 150 may include at least two SSDs 154 (e.g., at least a first SSD 154a and a second SSD 154b). For example, first SSD 154a (e.g., a credential SSD 154a) may be associated with a specific credential (e.g., a specific credit card credential, a specific loyalty card credential, or a specific public transit card credential provisioned by a remote subsystem) that may provide specific privileges or payment rights to electronic device 100, while second SSD 154b (e.g., an access SSD 154b) may be associated with an administration entity (e.g., an administration entity of administration entity subsystem 400, which may be a controlling entity for device 100) that may control access of device 100 to a specific credential of another SSD (e.g., first SSD 154a), for example, to provide specific privileges or payment rights to electronic device 100. Alternatively, each one of first SSD 154a and second SSD 154b may be associated with a respective specific credential (e.g., a specific credit card credential, a specific loyalty card credential, or a specific public transit card credential provisioned by a remote subsystem) that may provide specific privileges or payment rights to electronic device 100. An SSD 154 may include and/or be associated with at least one applet 153 (e.g., SSD 154a with applet 153a and SSD 154b with applet 153b). For example, an applet 153 of an SSD 154 may be an application that may run on a secure element of NFC component 120 (e.g., in a GlobalPlatform environment). A credential applet 153 may include or be associated with credential information. Each SSD 154 and/or applet 153 may also include and/or be associated with at least one of its own keys 155 (e.g., applet 153a with at least one key 155a and applet 153b with at least one key 155b).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element when first provided on device 100. As one example, while credential SSD 154a may be associated with a particular credit card credential, that particular credential may only be communicated as a commerce credential data communication to program provider subsystem 200 from a secure element of device 100 (e.g., from NFC component 120) for a transaction when applet 153a of that credential SSD 154a has been enabled or otherwise activated or unlocked for such use.

Security features may be provided for enabling use of NFC component 120 that may be particularly useful when transmitting confidential payment information, such as credit card information or bank account information of a credential, from electronic device 100 to program provider subsystem 200. Such security features also may include a secure storage area that may have restricted access. For example, user authentication via personal identification number ("PIN") entry or via user interaction with a biometric sensor may need to be provided to access the secure storage area. As an example, an access SSD 154b may leverage applet 153b to determine whether such authentication has occurred before allowing other SSDs 154 (e.g., a credential SSD 154a) to be used for communicating its credential information. In certain embodiments, some or all of the security features may be stored within NFC memory module 150. Further, security information, such as an authentication key, for communicating commerce credential data with program provider subsystem 200 may be stored within NFC memory module 150. In certain embodiments, NFC memory module 150 may include a microcontroller embedded within electronic device 100. As just one example, applet 153b of access SSD 154b may be configured to determine intent and local authentication of a user of device 100 (e.g., via one or more input components 110, such as a biometric input component) and, in response to such a determination, may be configured to enable another particular SSD for conducting a payment transaction (e.g., with a credential of a credential SSD 154*a*).

Description of FIG. 3 and FIGS. 3A-3D

As shown in FIG. 3, and as described below in more detail, a specific example of electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. For example, a touch screen I/O component 114*a* may include a display output component 112*a* and an associated touch input component 110*f*, where display output component 112*a* may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112*a*. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application, such as a program provider online resource application. For example, when the specific icon 182 labeled with a "Loyalty App" textual indicator 181 (i.e., specific icon 183) is selected by a user of device 100, device 100 may launch or otherwise access a specific third party program provider application (e.g., a native application or hybrid application). As another example, when the specific icon 182 labeled with an "Internet" textual indicator (i.e., specific icon 184) is selected by a user of device 100, device 100 may launch or otherwise access an internet browser application that may be directed to a URL of a web resource of a specific third party program provider for providing another type of program provider online resource to device 100. When any suitable program provider online resource is accessed, device 100 may be operative to display screens of a specific user interface that may include one or more tools or features for interacting with that program provider online resource using device 100 in a specific manner (see, e.g., FIGS. 3A-3D for specific examples of such displays of GUI 180 during use of any suitable application (e.g., a program provider online resource 113) that may be used by a device user for any carrying out any secure functionality of device 100 (e.g., making a transaction to program provider subsystem 200 with a payment and/or loyalty credential (e.g., a credential of credential SSD 154*a*) of device 100)). For each application, screens may be displayed on display output component 112*a* and may include various user interface elements. Additionally, or alternatively, for each application, various other types of non-visual information may be provided to a user via various other output components 112 of device 100. For example, in some embodiments, device 100 may not include a user interface component operative to provide a GUI but may instead provide an audio output component and mechanical or other suitable user input components for selecting and authenticating use of a payment credential and/or loyalty credential for conducting a transaction with program provider subsystem 200 and/or for conducting any other suitable secure functionality of device 100.

Description of FIG. 4

Referring now to FIG. 4, FIG. 4 shows further details with respect to particular embodiments of administration entity subsystem 400 of system 1. As shown in FIG. 4, administration entity subsystem 400 may be a secure platform system and may include a secure mobile platform ("SMP") broker component 440, an SMP trusted services manager ("TSM") component 450, an SMP crypto services component 460, an identity management system ("IDMS") component 470, a fraud system component 480, a hardware security module ("HSM") component 490, store component 420, and/or one or more servers 410. One, some, or all components of administration entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of administration entity subsystem 400 may be managed by, owned by, at least partially controlled by, and/or otherwise provided by a single administration entity (e.g., Apple Inc.) that may be distinct and independent from any financial institution subsystem and/or from program provider subsystem 200. The components of administration entity subsystem 400 may interact with each other and collectively with any suitable financial institution subsystem and/or electronic device 100 and/or program provider subsystem 200 for providing a new layer of security and/or for providing a more seamless user experience.

SMP broker component 440 of administration entity subsystem 400 may be configured to manage user authentication with an administration entity user account and/or to manage program provider validation with a program provider subsystem account. SMP broker component 440 may also be configured to manage the lifecycle and provisioning of credentials on device 100. SMP broker component 440 may be a primary end point that may control the user interface elements (e.g., elements of GUI 180) on device 100. An operating system or other application of an end user device (e.g., application 103, application 113, and/or application 143 of device 100) may be configured to call specific application programming interfaces ("APIs") and SMP broker 440 may be configured to process requests of those APIs and respond with data that may derive the user interface of device 100 and/or respond with application protocol data units ("APDUs") that may communicate with device 100 (e.g., via a communication path 25 between administration entity subsystem 400 and electronic device 100). Such APDUs may be received by administration entity subsystem 400 from a financial institution subsystem via a trusted services manager ("TSM") of system 1 (e.g., a TSM of a communication path between administration entity subsystem 400 and a remote subsystem (e.g., a financial institution subsystem)). SMP TSM component 450 of administration entity subsystem 400 may be configured to provide GlobalPlatform-based services or any other suitable services that may be used to carry out credential provisioning operations on device 100 from a financial institution subsystem. GlobalPlatform, or any other suitable secure channel protocol, may enable SMP TSM component 450 to properly communicate and/or provision sensitive account data between secure element 145 of device 100 and a TSM for secure data communication between administration entity subsystem 400 and a remote subsystem.

SMP TSM component 450 may be configured to use HSM component 490 to protect keys and generate new keys. SMP crypto services component 460 of administration entity subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the administration entity (e.g., an Apple iCloud™ account). Such a payment crypto service may be configured to be the only component of administration entity subsystem 400 that may have clear text (e.g., non-hashed) information describing commerce credentials (e.g., credit card numbers) of its user accounts in memory. IDMS component 470 may be configured to enable and/or manage any suitable communication between device 100 and another device, such as an identity services ("IDS") transport (e.g., using a commercial-entity specific service (e.g., iMessage™ by Apple Inc.). For example, certain devices may be automatically or manually registered for such a service (e.g., all devices in an eco-system of administration entity 400 may be automatically registered for the service). Such a service may provide an end-to-end encrypted mechanism that may require active registration before messages can be sent using the service. IDMS component 470 and/or any other suitable server or portion of administration entity subsystem 400 may be operative to identify or otherwise lookup the status of any credentials provisioned on any electronic devices associated with a given user account or otherwise, such that administration entity subsystem 400 may be operative to efficiently and effectively identify one or more non-native payment credentials that may be available to a particular client device associated with a particular user account (e.g., multiple devices of a family account with administration entity subsystem 400). Administration entity fraud system component 480 of administration entity subsystem 400 may be configured to run an administration entity fraud check on a commerce credential based on data known to the administration entity about the commerce credential and/or the user (e.g., based on data (e.g., commerce credential information) associated with a user account with the administration entity and/or any other suitable data that may be under the control of the administration entity and/or any other suitable data that may not be under the control of a remote subsystem). Administration entity fraud system component 480 may be configured to determine an administration entity fraud score for the credential based on various factors or thresholds. Additionally or alternatively, administration entity subsystem 400 may include store 420, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, etc.). As just one example, store 420 may be configured to manage and provide an application 113 to device 100 (e.g., via communications path 25), where application 113 may be any suitable application, such as a banking application, a program provider application, an e-mail application, a text messaging application, an internet application, a card management application, or any other suitable communication application. Any suitable communication protocol or combination of communication protocols may be used by administration entity subsystem 400 to communicate data amongst the various components of administration entity subsystem 400 (e.g., via at least one communications path 495 of FIG. 4) and/or to communicate data between administration entity subsystem 400 and other components of system 1 (e.g., program provider subsystem 200 via communications path 35 of FIG. 1 and/or electronic device 100 via communications path 25 of FIG. 1).

Figure 5:
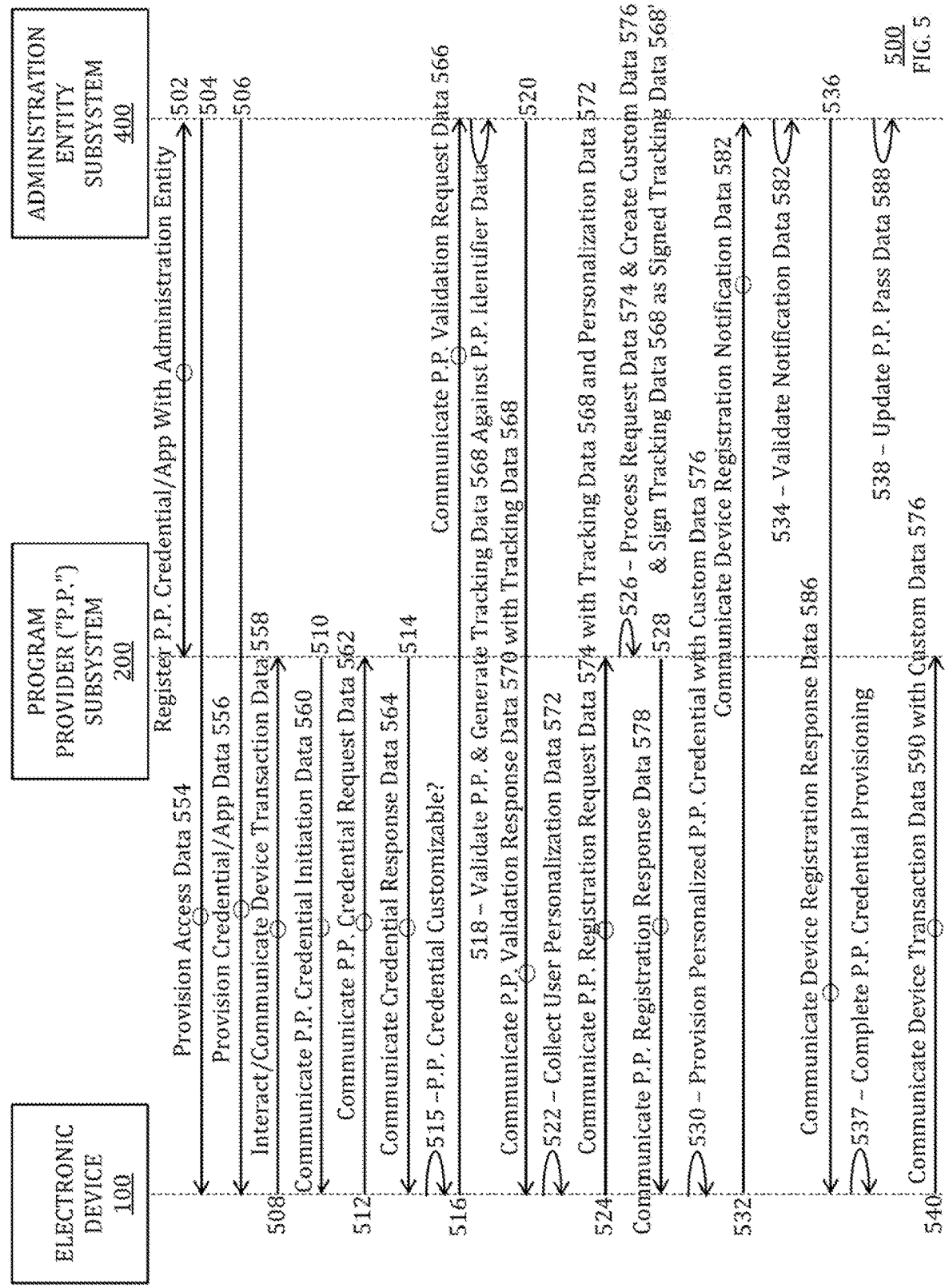
FIGS. 5-8 are flowcharts of illustrative processes for personalizing program credentials.

Description of FIG. 5

FIG. 5 is a flowchart of an illustrative process 500 for personalizing loyalty program (or "program provider") credentials. Process 500 is shown being implemented by electronic device 100, administration entity subsystem 400, and program provider subsystem 200. However, it is to be understood that process 500 may be implemented using any other suitable components or subsystems. Process 500 may provide a seamless user experience for securely and efficiently personalizing and provisioning program provider credentials of a third party program provider subsystem 200 on electronic device 100, such as for use as a loyalty pass by electronic device 100 in a transaction (e.g., an online transaction or a contactless proximity based transaction) with program provider subsystem 200. To facilitate the following discussion regarding the operation of system 1 for personalizing program provider credentials according to process 500 of FIG. 5, reference is made to various components of system 1 of the schematic diagrams of FIGS. 1-4, and to front views of screens 190-190d of FIGS. 3-3D that may be representative of a graphical user interface of device 100 (e.g., a GUI as may be provided by a card or credential management application (e.g., a wallet or passbook application (e.g., an application 103)) and/or program provider online resource 113 or any suitable application of device 100) during such a process. The operations described may be achieved with a wide variety of graphical elements and visual schemes. Therefore, the embodiments of FIGS. 3-3D are not intended to be limited to the precise user interface conventions adopted herein. Rather, embodiments may include a wide variety of user interface styles. While the term "program provider" may be utilized for describing program provider subsystem 200 and/or any feature thereof, such as a program provider online resource or key or server or terminal or identifier or pass, it is to be understood that subsystem 200 may be any suitable subsystem operated by any suitable third party entity that may be distinct from an owner or user of electronic device 100 and/or from administration entity subsystem 400. For example, program provider subsystem 200 may be any suitable third party subsystem that may enable the initiation of a provisioning and/or personalization process for a credential or pass on device 100 and/or any suitable subsystem that may receive such credential or pass information from device 100 for furthering a transaction (e.g., a transaction that may benefit or otherwise be associated with one or more loyalty features of a loyalty pass).

At step 502 of process 500, program provider subsystem 200 may be registered with administration entity subsystem 400. For example, at step 502, a program provider application or program provider online resource 113 (e.g., native app, domain/URL, or any other suitable web resource, or perhaps even a program provider terminal) of program provider subsystem 200 may be associated with a particular program provider identifier 167 and a particular program provider key 157, each of which may be securely shared between program provider subsystem 200 and administration entity subsystem 400 in any suitable manner, and such an association may be accessible to administration entity subsystem 400 (e.g., in table 430). In some embodiments, a developer of a native application (e.g., a native application program provider online resource 113) may use a system of entitlements to allow the application access to secure device functionality of electronic device 100 running the application (e.g., push messaging, cloud storage, secure element credential payments, etc.), where the entitlements may be signed into the application's binary as part of a code signing process that may be required to enable the application to be registered by administration entity subsystem 400 (e.g., for deployment in application store 420 and/or for securely associating a program provider key 157 and program provider identifier 167 of the application in table 430), where, for example, program provider identifier 167 may form a part of the application's entitlements. Unlike such a native application, web resources (e.g., a website program provider online resource 113) may not have code-signing or similar protections that may be provided (e.g., by administration entity subsystem 400) to native applications operative to be run on electronic device 100. Instead, ownership of a domain of a web resource may be proven before that web resource may be registered. For registering a website program provider online resource 113 owned or otherwise controlled by program provider subsystem 200, such ownership must be proven to administration entity subsystem 400 prior to administration entity subsystem 400 registering that program provider online resource 113 (e.g., prior to a particular program provider identifier 167 and a particular program provider key 157 being associated with that program provider online resource 113 and shared between program provider subsystem 200 and administration entity subsystem 400 for future access by administration entity subsystem 400 (e.g., in table 430, where a program provider identifier 167 and associated program provider key 157 of a validated program provider application 113 may be stored against or otherwise in association with one another for future use)). Administration entity subsystem 400 may be operative to validate any portion of such a program provider online resource 113 at step 502 prior to registering any suitable program provider identifier 167 and program provider key(s) 157 for that online resource 113 at administration entity subsystem 400. Any suitable process or processes may be utilized at step 502 for securely registering the validity of any suitable type of program provider online resource 113 of program provider subsystem 200 with administration entity subsystem 400 (e.g., any native app, hybrid app, web resource, or even a program provider terminal of the program provider to be utilized by an electronic device, whether running locally on the device or hosted remotely on a server or positioned proximately to the device), whereby at least one program provider identifier 167 associated with the program provider online resource 113 and at least one program provider key 157 (e.g., symmetric or asymmetric key pair) may be associated with the program provider online resource 113 and may be made accessible to both program provider subsystem 200 and administration entity subsystem 400 (e.g., in table 430) for future use, and any suitable data may be communicated between program provider subsystem 200 and administration entity subsystem 400 during any such process in any suitable manner (e.g., application 113, key 157, identifier 167, and/or any other suitable data via communications path 35 using any suitable communications protocol(s)). For example, step 502 may include program provider keys 157 being shared between administration entity subsystem 400 and program provider subsystem 200 with respect to one or more program provider identifiers 167 associated with an online resource 113, where such keys 157 may be used for signing and/or encrypting data at program provider subsystem 200 (e.g., at step 526) and unsigning and/or decrypting that data at administration entity subsystem 400 (e.g., at step 534) or vice versa.

Additionally or alternatively, at step 502, a program provider loyalty pass or other suitable program provider credential of program provider subsystem 200 to later be provisioned on device 100 (e.g., as a credential SSD (e.g., SSD 154*a*)) may similarly be associated with a particular program provider identifier 167 and a particular program provider key 157, each of which may be securely shared between program provider subsystem 200 and administration entity subsystem 400 in any suitable manner, and such an association may be accessible to administration entity subsystem 400 (e.g., in table 430, where a program provider identifier 167 and associated program provider key 157 of a validated program provider credential may be stored against or otherwise in association with one another for future use)). Administration entity subsystem 400 may be operative to validate any portion of such a program provider credential in any suitable manner at step 502 prior to registering any suitable program provider identifier 167 and program provider key(s) 157 for that program provider credential at administration entity subsystem 400. For example, administration entity subsystem 400 may be operative to run a fraud check or other background check on program provider subsystem 200. Additionally or alternatively, administration entity subsystem 400 may be operative to analyze any suitable data of the program provider credential to ensure it meets certain requirements of any suitable program of administration entity subsystem 400 (e.g., analyze a personalization request portion of a file (e.g., a JavaScript Object Notation ("JSON") file) of a program provider credential (e.g., a portion of a program provider loyalty pass that may be customizable to a particular user) to ensure it only requests certain types of personal data from an end user). One or more program provider identifiers may be associated with a particular program provider online resource 113 and/or with a particular program provider credential, such as a first program provider identifier 167 uniquely associated with a particular program provider online resource 113 or with a particular program provider credential and/or a second program provider identifier 167 associated with each program provider online resource 113 and/or each program provider credential of a particular program provider subsystem 200. Additionally, or alternatively, one or more program provider keys may be associated with a particular program provider identifier or with a particular program provider online resource 113 and/or with a particular program provider credential. All such program provider key and program provider identifier associations may be stored by or otherwise accessible to administration entity subsystem 400 (e.g., in one or more tables 430) and to program provider subsystem 200 at one or more instances of step 502. For example, when a program provider of program provider subsystem 200 attempts to join a program of administration entity subsystem 400 (e.g., a program provider credential program), program provider subsystem 200 may be provided with the ability to create or otherwise have generated an "enhanced passbook certificate" that may include one or more program provider keys 157 and at least one program provider identifier 167 for a program provider credential, which may be stored or otherwise made accessible to program provider subsystem 200 and to administration entity subsystem 400 (e.g., such data may be whitelisted by server 410 (e.g., in table 430)).

At step 504, access data 554 may be provisioned on device 100 by administration entity subsystem 400. For example, an access SSD (e.g., SSD 154b) may be provisioned on secure element 145 of device 100 as access data 554 from server 410 of administration entity subsystem 400 in order to more securely enable device 100 to communicate with administration entity subsystem 400. As mentioned, access SSD 154b may be at least partially provisioned on secure element 145 of device 100 directly from administration entity subsystem 400 (e.g., as access data 554 via communication path 25 between server 410 of administration entity subsystem 400 and communications component 106 of device 100, which may then be passed to secure element 145 from communications component 106 (e.g., via bus 118)). Access data 554 via path 25 may be provisioned on secure element 145 of device 100 as at least a portion or all of an access SSD 154b and may include access applet 153b and/or access key 155b. Step 504 may be at least partially carried out when device 100 is initially configured (e.g., by administration entity subsystem 400 before device 100 is sold to a user). Alternatively, or additionally, step 504 may be at least partially carried out in response to a user of device 100 initially setting up secure element 145 of NFC component 120. Additionally, or alternatively, access data 554 may include ISD key 156k for ISD 152 of secure element 145 and may be used in addition to or as an alternative to access key 155b for enabling secure transmissions between administration entity subsystem 400 and device 100. Additionally, or alternatively, access data 554 may include any other suitable key(s) that may be used in addition to or as an alternative to access key 155b and/or access key 155a and/or ISD key 156k for enabling secure transmissions between administration entity subsystem 400 and device 100 (e.g., for use as any suitable administration entity key or shared secret between administration entity subsystem 400 and device 100). Alternatively, or additionally, access data 554 may include any other suitable administration entity key or shared secret between administration entity subsystem 400 and device 100 that may not be stored on a secure element of device 100 but that may be accessible to other portions of device 100, such as processor 102 via memory 104.

At step 506, process 500 may include provisioning any suitable credential and/or application data 556 on device 100 from any suitable remote subsystem (e.g., financial institution subsystem and/or program provider subsystem 200 directly (not shown in FIG. 5) or via administration entity subsystem 400). Such data 556 may be from any suitable remote subsystem and may be credential data (e.g., payment credential data) that may be provisioned on device 100 (e.g., secure element 145) as at least a portion or all of credential SSD 154a and may include credential applet 153a with credential information, where step 506 may be at least partially carried out when a user of device 100 selects a particular payment credential to be provisioned on device 100. In some embodiments, such credential data 556 may also include access key 155a, which may be initially provided from administration entity subsystem 400 to a remote subsystem (e.g., a financial institution subsystem) and/or may be added by administration entity subsystem 400. In some embodiments, such credential data 556 may include the primary account number as at least a portion of credential information of a payment credential being provisioned, an application identifier ("AID"), an SSD identifier, and/or an SSD counter. Additionally, or alternatively, such data 556 may be from program provider subsystem 200 (e.g., via communications path 15 or as a contactless proximity-based communication 5 and/or via administration entity subsystem 400 and paths 35 and 25) and may be program provider application data (e.g., program provider online resource application 113) being accessed by device 100. For example, a program provider's resource application 113 may be loaded onto device 100 from administration entity subsystem 400 (e.g., from application store 420) at step 506 for later use (e.g., a user of device 100 may select a "Loyalty App" icon 183 of a specific screen 190 of GUI 180 using touch screen input component 110f of I/O component 114a, and this selection may be recognized by device 100 as an initiation event for providing the user with the ability to interact with a program provider's third party application 113 previously loaded onto device 100 at step 506).

At step 508, device 100 may interact with any suitable component of program provider subsystem 200 in any suitable manner that may be operative to facilitate the eventual communication of program provider credential response data 564 from program provider subsystem 200 to device 100 at step 514, where program provider credential response data 564 may include any suitable data for providing a generic program provider credential on device 100 (e.g., a generic and/or anonymous loyalty card). Such program provider credential response data 564 may follow any suitable data format, such as a zipped package that, for example, may have a pkpass file extension. Such a package may include, for example, one or more presentable media files (e.g., .png image files or otherwise) that may be operative to be displayed or otherwise presented by device 100 in various instances of a user interface to indicate the presence of the program provider credential for use (e.g., in a digital wallet UI of the credential management application, in a notification, in an e-mail, on a lock screen, etc.), a manifest.json file that may be a JSON dictionary that identifies each other file in the package bundle, a signature (e.g., a detached Public Key Cryptography Standards ("PKCS") #7 signature of the manifest.json file), and/or a pass.json file that may be a JSON dictionary that may define the program provider credential pass itself and may include, for example, a brief presentable description of the pass as a localizable string, a format version, an organization presentable description of the program provider that may have originated and/or signed the pass, a pass type identifier (e.g., as issued by administration entity subsystem 400 as a program provider identifier 167 associated with the program provider credential (e.g., with a signing certificate and/or key)), a unique pass identifier (e.g., a serial number) that may uniquely identify the pass of the program provider credential (e.g., no two passes with the same pass type identifier may have the same serial number), a team identifier of the program provider that may have originated and/or signed the pass, and/or the like. Moreover, in some embodiments, such a package may also include a personalization.json file that may include any suitable data of any suitable format that may be signed with a program provider key 157 or otherwise with an enhanced passbook certificate, for example. The presence of such a suitable personalization.json file in program provider credential response data 564 may be detected by device 100 in order to make a determination that the program provider credential of program provider credential response data 564 may be personalized (e.g., as described with respect to step 515). Therefore, program provider credential response data 564 may include any suitable first program provider credential information that may be indicative of any suitable generic program provider credential, and program provider credential response data 564 may also include any suitable second program provider credential information that may be indicative of the customizability of the generic program provider credential.

Any suitable combination of actions may result in such program provider credential response data 564 being received by device 100 at step 514. As one example, device 100 may be positioned proximate any suitable program provider terminal 220 of program provider subsystem 200 at step 508 such that program provider credential response data 564 may be communicated to device 100 from that program provider terminal 220 at step 514 (e.g., where such a program provider terminal 220 may be an NFC tag or may be an NFC reader (e.g., a tag that may be embedded in or otherwise provided as a portion of an advertisement for a loyalty credential of program provider subsystem 200) that may be operative to communicate such program provider credential response data 564 to device 100 (e.g., via NFC component 120 as a communication 5 (e.g., a push communication)) when device 100 is positioned within distance D of such a program provider terminal 220 (e.g., when NFC component 120 is in an always-on or easily actionable reader mode)), which may be referred to herein as a tap to provision use case. Alternatively, a user of device 100 may actively select a link on a website or within any suitable program provider online resource 113 of device 100 at step 508 that may be operative to request that program provider credential response data 564 be communicated to device 100 from program provider server 210 of program provider subsystem 200 at step 514. Alternatively, device 100 may be positioned proximate any suitable program provider component (e.g., an NFC tag, a QR code, etc., which may be embedded in or otherwise provided as a portion of an advertisement for a loyalty credential of program provider subsystem 200) at step 508 (e.g., using NFC component 120 or a camera or other suitable scanner component of device 100) to capture such a link to a uniform resource locator ("URL") of a program provider online resource of program provider subsystem 200 as program provider credential initiation data 560 at step 510 or device 100 may receive such a link as data 560 at step 510 through any other suitable manner (e.g., via an e-mail or text message received at device 100), and device 100 may then be operative to utilize that link with any suitable online resource of device 100 to communicate (e.g., automatically) program provider credential request data 562 to an appropriate program provider server 210 of program provider subsystem 200 associated with the URL of data 560 at step 512, and then that program provider server 210 may respond to that program provider credential request data 562 by communicating program provider credential response data 564 to device 100 at step 514 (e.g., via communications path 15), which may also be referred to herein as a tap to provision use case. Alternatively, device 100 may communicate any suitable device transaction data 558 to program provider subsystem 200 at step 508 that may include payment credential data (e.g., data from a payment credential SSD provisioned on device 100 at step 506) for conducting a financial transaction with program provider subsystem 200, where such device transaction data 558 may be communicated as a contactless proximity-based communication 5 to program provider terminal 220 (e.g., according to a Europay MasterCard Visa ("EMV") standard or a FeliCa standard) or as an online communication via communications path 15 to program provider server 210, and where initial program provider credential data 560 may then be communicated to device 100 from program provider subsystem 200 at step 510 (e.g., from server 210 or terminal 220) that may include any suitable transaction response data (e.g., confirmation of receipt of such payment credential data or confirmation of the financial transaction being complete) along with any suitable additional data (e.g., a URL as mentioned above) that may be operative to enable device 100 at step 512 to communicate program provider credential request data 562 for then receiving program provider credential response data 564 at step 514, where such additional data may be provided according to a value added services ("VAS") protocol (e.g., when such additional data may be communicated from a program provider terminal 220 to device 100 as a communication 5). Alternatively, device 100 may communicate any suitable device transaction data 558 to program provider subsystem 200 at step 508 that may include payment credential data for conducting a financial transaction with program provider subsystem 200, where such device transaction data 558 may be communicated as a contactless proximity-based communication 5 to program provider terminal 220 (e.g., according to a Europay MasterCard Visa ("EMV") standard or a FeliCa standard) or as an online communication via communications path 15 to program provider server 210, and where program provider credential response data 564 may then be communicated to device 100 from program provider subsystem 200 at step 514 (e.g., from server 210 over path 15 or from terminal 220 as a communication 5) that may include any suitable transaction response data (e.g., confirmation of receipt of such payment credential data or confirmation of the financial transaction being complete) along with any suitable data for providing a program provider credential on device 100 (e.g., a generic and/or anonymous loyalty card), where such program provider credential data may be provided according to a VAS protocol (e.g., when such additional data may be communicated from a program provider terminal 220 to device 100 as a communication 5). Therefore, in some embodiments, program provider subsystem 200 may push a program provider credential (e.g., a program provider loyalty pass) to device 100 as part of another transaction with device 100. In some embodiments, program provider credential initiation data 560 and/or program provider credential response data 564 may include action identifier data, which may be indicative of the type of program provider credential to be created (e.g., create loyalty account, etc.), and of account identifier data, which may be indicative of a specific identifier number of a specific program provider card (e.g., an NFC-tagged loyalty card may be communicated as data 560 and/or data 564 and/or a photographical or other scanned image of a loyalty card may be communicated as data 560 and/or data 564 that may be indicative of the actual account number printed on that card).

Once program provider credential response data 564 is received by device 100 at step 514 for providing a program provider credential on device 100 (e.g., a generic and/or anonymous loyalty card), device 100 (e.g., a device application, such as a credential management application 103) may be operative to process program provider credential response data 564 at step 515 to determine whether such program provider credential response data 564 includes particular data (e.g., a personalization.json file, as mentioned above) that may be indicative of a capability of the program provider credential of program provider credential response data 564 to be customized (e.g., personalized by a user of device 100). As mentioned, program provider credential response data 564 may include any suitable first program provider credential information that may be indicative of any suitable generic program provider credential as well as any suitable second program provider credential information that may be indicative of the customizability of the generic program provider credential, and device 100 may be operative to process program provider credential response data 564 at step 515 to determine whether program provider credential response data 564 includes at least such second program provider credential information. Such processing of step 515 may be carried out automatically by device 100 and/or transparently to a user of device 100 (e.g., certain data of program provider credential response data 564 may be operative to indicate to device 100 (e.g., a credential management application 103) that program provider credential response data 564 is of a type that might be customizable). If it is determined at step 515 that the program provider credential defined by program provider credential response data 564 is not customizable, device 100 may be operative to automatically add the program provider credential to a digital wallet of device 100 for later use (e.g., as a generic loyalty pass) or may be operative to request a user accept or reject the program provider credential before adding it to the digital wallet or deleting the program provider credential from device 100. For example, as shown in FIG. 3A, a GUI of device 100 may provide screen 190*a*, where an application (e.g., a credential management application 103 or a program provider online resource application 113 that may be associated with the program provider credential (e.g., by sharing a program provider identifier or otherwise)) may indicate to a user of device 100 with information 307 that a new generic program provider credential has been received and may ask whether the user would like to add the new credential to the digital wallet of the device, and may enable a user to select an option 309 (e.g., radio button) to add the credential or to select an option 311 (e.g., radio button) not to add (e.g., delete) the credential. However, if it is determined at step 515 that the program provider credential defined by program provider credential response data 564 is customizable, device 100 may be operative to automatically generate and communicate program provider validation request data 566 to administration entity subsystem 400 at step 516.

At step 516 of process 500, in response to device 100 determining at step 515 that the program provider credential defined by program provider credential response data 564 may be personalized (e.g., personalized or customized, and/or otherwise modified to be associated with a particular user or group of users (e.g., a family)), device 100 may be operative to generate and communicate program provider validation request data 566 to administration entity subsystem 400 (e.g., via communications path 25 using any suitable communications protocol(s)) for initiating a validation session of the customizable program provider credential. Program provider validation request data 566 communicated from device 100 to administration entity subsystem 400 at step 516 may include any suitable data for attempting to determine the validity of the program provider credential of program provider credential response data 564, including, but not limited to, a program provider identifier associated with the program provider credential to be validated (e.g., a program provider identifier of program provider credential response data 564 (e.g., a pass type identifier), which may be the same as at least one program provider identifier 167 as registered at step 502 for the program provider credential) and any suitable data indicative of the determination made at step 515 that the program provider credential defined by program provider credential response data 564 is customizable (e.g., a particular type of data of program provider credential response data 564 that may be indicative of the ability of the program provider credential defined by program provider credential response data 564 to be personalized). In some embodiments, only program provider identifier data but not action identifier data and/or not account identifier data may need to be included in data 566 for validation by administration entity subsystem 400, although each of such data types may be included and validated in other embodiments. Program provider validation request data 566 may be properly addressed to administration entity subsystem 400 based on a challenge request target identifier (e.g., a Challenge Request URL (e.g., a URL identifying server 410 of administration entity subsystem 400 that is to work with device 100 for validating the program provider credential)). A device application (e.g., a credential management application 103) may have such a challenge request target identifier programmed as part of any suitable operating system or application update that may be controlled by administration entity subsystem 400, such that the challenge request target identifier may be updated on device 100 by administration entity subsystem 400 at any suitable time and automatically accessible by the device application during process 500.

At step 518 of process 500, in response to administration entity subsystem 400 receiving any suitable program provider validation request data 566 from device 100 at step 516, administration entity subsystem 400 (e.g., SMP broker component 440) may be operative to validate the program provider credential identified by the program provider identifier 167 of the program provider validation request. For example, at step 518, administration entity subsystem 400 may be operative to attempt to confirm that the program provider credential identified by a program provider identifier 167 of received program provider validation request data 566 is a valid and registered program provider credential at administration entity subsystem 400, which may be confirmed by identifying that program provider identifier 167 in table 430 (e.g., to determine that the program provider identifier 167 has been previously registered with administration entity subsystem 400 (e.g., at step 502) for the program provider credential and that such registration of the program provider credential is still valid (e.g., that administration entity subsystem 400 has not removed program provider identifier 167 from table 430 or has not flagged program provider identifier 167 in table 430 due to its program provider credential being suspicious or otherwise no longer trusted and/or that a certificate associated with the program provider identifier 167 (e.g., in table 430) is still valid)). Additionally, or alternatively, validation of step 518 may include administration entity subsystem 400 attempting to confirm that the program provider credential identified by a program provider identifier 167 of received program provider validation request data 566 is a valid and registered program provider credential at administration entity subsystem 400 that is also a customizable program provider credential. For example, administration entity subsystem 400 may be operative to determine that a program provider identifier 167 identified from request data 566 is also a program provider identifier 167 in table 430 that may be associated with a customizable registered credential (e.g., to determine that the program provider identifier 167 has been previously registered with administration entity subsystem 400 (e.g., at step 502) for the program provider credential and that such registration of the program provider credential is still valid and that such registration is indicative of a program provider credential that may be personalized (e.g., at step 502, registration of a program provider credential to be personalized may include administration entity subsystem 400 validating that the program provider credential may be used for personalization purposes in any suitable manner and then whitelisting or otherwise registering that program provider credential's program provider identifier as being customizable (e.g., in table 430))). Therefore, administration entity subsystem 400 may be operative to ensure, at step 518, that a particular program provider and/or a particular program provider credential that may be identified by request data 566 is in good standing and approved by administration entity subsystem 400 for personalization services (e.g., using any suitable data accessible to administration entity subsystem 400, including any data from step 502).

After any suitable successful validation of received program provider validation request data 566 by administration entity subsystem 400 (e.g., after validation of a program provider identifier of received program provider validation request data 566 and/or validation of its program provider credential as having been registered as customizable), or, potentially after a failed validation attempt, administration entity subsystem 400 may also be operative, at step 518, to generate any suitable tracking data 568 and to store that tracking data 568 against any suitable identifier data of the received program provider validation request data 566 (e.g., a program provider identifier 167 of the program provider credential of data 564). For example, administration entity subsystem 400 may be operative to generate any suitable tracking data 568 (e.g., any suitable token data or random data via entropy) and then store that tracking data 568 against a program provider identifier 167 of validation request data 566) in any suitable data structure (e.g., in table 430 or otherwise) accessible to administration entity subsystem 400. Such a stored link or association between such tracking data 568 and program provider identifier data of the validation session (e.g., of any suitable iteration of one, some, or all of steps 514-538) may be later used by administration entity subsystem 400 to further validate the program provider credential of the validation session (e.g., at step 534) and/or to further secure and/or track the personalization of the program provider credential on device 100.

In response to administration entity subsystem 400 validating received program provider validation request data 566 and generating tracking data 568 against program provider identifier data at step 518 (e.g., associating tracking data 568 with a particular program provider identifier 167 at administration entity subsystem 400), administration entity subsystem 400 may be operative to communicate such tracking data 568 as at least a portion of program provider validation response data 570 to electronic device 100 at step 520 that may be indicative of such validation (e.g., via communications path 25 using any suitable communications protocol(s)). Such program provider validation response data 570 may include any other suitable data in addition to tracking data 568, including, but not limited to, the program provider identifier data of validation request data 566 and/or any other suitable data that may be used by device 100 and/or program provider subsystem 200 to generate a personalized program provider credential. At least a portion of program provider validation response data 570 (e.g., at least tracking data 568) may be signed by administration entity subsystem 400 (e.g., in an HTTP header or otherwise) with an access key associated with administration entity subsystem 400 that may also be accessible to electronic device 100 (e.g., any key that may be known to a device application (e.g., a credential management application 103)), such that device 100 may validate the signature upon receiving the signed data to confirm that administration entity subsystem 400 generated program provider validation response data 570 rather than another entity subsystem that may not be trusted by electronic device 100 and/or such that the signed program provider validation response data 570 may not be utilized by an entity that may not have access to such an access key. Alternatively, in response to administration entity subsystem 400 not validating received program provider validation request data 566 at step 518, in which case tracking data 568 may or may not be generated and stored against program provider identifier data at step 518, administration entity subsystem 400 may be operative to communicate any tracking data 568 as at least a portion of program provider validation response data 570 to electronic device 100 at step 520 that may be indicative of no validation (e.g., via communications path 25 using any suitable communications protocol). In some embodiments, no tracking data 568 may be generated at step 518 and/or included as at least a portion of program provider validation response data 570 at step 520 if the program provider credential is not validated for personalization at step 518, and such a lack of tracking data as at least a portion of program provider validation response data 570 may be determined by device 100 and such a determination may be operative to direct device 100 to skip any personalization of the program provider credential (e.g., to skip one or more of steps 522-537). For example, personalization or customization of a loyalty pass for a user may allow the user's utilization of that pass to be tracked for personalized incentives (e.g., for rewards and/or communicating offers), while a generic pass may still entitle the user (e.g., loyalty pass holder) to standard incentives (e.g., a percentage discount).

As mentioned, a user of device 100 may select a GUI element (e.g., radio button), such as option 309 of FIG. 3A, for conveying the user's desire to add the generic program provider credential to the digital wallet of device 100. As shown in FIG. 3B, device 100 may be configured to provide screen 190b in response to device 100 receiving selection of option 309 of screen 190a of FIG. 3A and also device 100 determining (e.g., at step 515) that the program provider credential of data 564 is indicative of being customizable (e.g., by receiving program provider validation response data 570 with suitable tracking data or otherwise data indicative the program provider credential being valid and able to be personalized). Alternatively, device 100 may be operative to provide screen 190b in response to device 100 determining (e.g., at step 515) that the program provider credential of data 564 is indicative of being customizable and not also in response to any user interaction with screen 190a or otherwise. In any event, as shown in FIG. 3B, a GUI of device 100 may provide screen 190b, where an application (e.g., a credential management application 103 or a program provider online resource application 113 that may be associated with the program provider credential (e.g., by sharing a program provider identifier or otherwise)) may indicate to a user of device 100 with information 313 that the new generic program provider credential may be personalized and may ask whether the user would like to personalize this new credential, and may enable a user to select an option 315 (e.g., radio button) to personalize the credential or to select an option 317 (e.g., radio button) not to personalize the credential. If option 315 is selected, device 100 may then proceed to step 522 if device 100 has already received positive program provider validation response data 570 at step 520 or device 100 may proceed to step 516 if option 315 is presented and selected prior to step 516, which may eventually lead to step 522 if positive program provider validation response data 570 is received at step 520. If option 317 is selected, device 100 may be operative to add the generic card to the digital wallet or to keep the generic card in the wallet if previously added. When no positive program provider validation response data 570 is received at step 520 (e.g., if administration entity subsystem 400 does not validate the program provider credential for personalization at step 518), device 100 may be operative to provide screen 190a of FIG. 3A to enable a user to add the generic program provider credential to the digital wallet of device 100 even if program provider validation response data 570 is received at step 520 that may be indicative of administration entity subsystem 400 having not validated the program provider credential for personalization at step 518. For example, the program provider credential may nonetheless be approved for generic use. Alternatively, device 100 may not be operative to provide screen 190a of FIG. 3A and/or may be operative to automatically delete the generic program provider credential (e.g., at least a portion of program provider credential response data 564) from device 100 if program provider validation response data 570 is received at step 520 that may be indicative of administration entity subsystem 400 having not validated the program provider credential for personalization at step 518 and also having not approved the program provider credential for generic use.

In any event, when process 500 advances to step 522, which may or may not be allowed by device 100 until suitable tracking data 568 has been received by device 100, device 100 may be operative to collect user personalization data 572 at step 522 that may be used for personalizing the program provider credential. User personalization data 572 may include any suitable data associated with a personal characteristic of a particular user, a particular account, or with a characteristic of device 100, including, but not limited to, name, e-mail address, telephone number, zip code, mailing address, pseudonym or user name, social media log-in credentials, birthday, gender, user preferences related to goods or services of the program provider, and/or the like. For example, as shown in FIG. 3C, a GUI of device 100 may provide screen 190c, where an application (e.g., a credential management application 103 or a program provider online resource application 113 that may be associated with the program provider credential (e.g., by sharing a program provider identifier or otherwise)) may indicate to a user of device 100 with information 319 that personal data may be provided for personalizing the program provider credential, and may include one or more suitable data fields associated with some or all of the personal data that may be collected at step 522, such as data field 321 for name data (e.g., name data "A"), data field 323 for e-mail address data (e.g., e-mail address data "B"), data field 325 for telephone number data (e.g., telephone number data "C"), and/or data field 327 for zip code data (e.g., zip code data "D"), as well as an option 329 (e.g., radio button) to submit the data of the data fields as personalization data 572 for personalizing the program provider credential. In some embodiments, device 100 may be operative to automatically populate one or more of the data fields of screen 190c automatically at step 522 in any suitable manner, such as by pulling appropriate data from any suitable data source(s) that may be available to device 100 (e.g., personal user data from a "me" card of a contacts device application of device 100 or any suitable user profile information available to device 100 (e.g., from memory 104 and/or from administration entity subsystem 400)), such that screen 190c may enable a user to confirm and/or edit such auto-populated (e.g., pre-populated) data fields rather than manually entering initial data into those data fields. Alternatively, in some embodiments, device 100 may be operative to automatically determine personalization data 572 without requiring any user interaction at step 522 (e.g., without providing screen 190c). While any suitable data of program provider credential response data 564 may define one or more types of personal data desired by program provider subsystem 200 for personalizing the program provider credential, device 100 (e.g., a credential management application 103) may be operative to limit the types of personalization data 572 to be collected at step 522 to a particular set of personal data types (e.g., name, e-mail address, telephone number, and zip code) for protecting a user of device 100. While certain data of program provider credential response data 564 may be indicative of the ability for the program provider credential to be personalized, device 100 (e.g., a credential management application 103) may be operative to use that data to generate screen 190c and/or to collect the data for one or more particular data fields, without such data fields being explicitly defined by program provider credential response data 564 (e.g., a device application may be configured with a pre-defined set of personal information data fields for which it may collect personal data when a customizable program provider credential is detected). In some embodiments, administration entity subsystem 400 may be operative to define a fixed set of personal information data fields, one or more of which may be selected by program provider subsystem 200 when defining a program provider credential (e.g., when defining a personalization.json file of program provider credential response data 564 of a program provider credential). This may prevent certain types of personalization data from potentially being obtained by program provider subsystem 200 from device 100 during process 500. In some embodiments, in response to detecting that user personalization data may be collected, a credential management application 103 may be configured to define the limited types of personal data that may be collected at step 522, rather than such types of data being defined by any data received from program provider subsystem 200 (e.g., firmware or device software not managed by a program provider (e.g., an operating system application or application managed by administration entity subsystem 400) may be operative to define and/or to present to the user of device 100 the type(s) of personalization data that may be collected for use in personalizing a program provider pass, such that the user may be more willing to trust that the personal data to be entered is appropriate and approved by a trusted entity (e.g., administration entity subsystem 400), rather than just willingly entering whatever personal data that may seem to be requested by a particular program provider). In some embodiments, at least a portion of user personalization data 572 may be provided from administration entity subsystem 400 as at least a portion of program provider validation response data 570, as administration entity subsystem 400 may be operative to store or have access to certain personal information of a user of device 100 (e.g., name, e-mail address, telephone number, and/or zip code may be included as a portion of a user profile associated with device 100 at administration entity subsystem 400) such that some or all of user personalization data 572 may be provided by administration entity subsystem 400 such that device 100 may not have to collect such data from memory of device 100 or request such data from a user of device 100.

At step 524 of process 500, once user personalization data 572 has been collected at step 522 (e.g., automatically or with any suitable user interaction), electronic device 100 may be operative to communicate such user personalization data 572 as at least a portion of program provider registration request data 574 to program provider subsystem 200 (e.g., via communications path 15 to program provider server 210 or as a contactless proximity-based communication 5 to program provider terminal 220, using any suitable communications protocol(s)). Such program provider registration request data 574 may include any other suitable data in addition to user personalization data 572, including, but not limited to, tracking data 568 (e.g., as received by device 100 from administration entity subsystem 400 as at least a portion of program provider validation response data 570 at step 520) and/or program provider identifier data of the program provider credential, such as program provider identifier data from program provider credential response data 564 and/or from program provider validation response data 570 (e.g., a URL that data 574 may be delivered to may include a program provider identifier and/or a serial number of the program provider credential (e.g., for routing and/or lookup by program provider subsystem 200)), and/or action identifier data and/or account identifier data of data 560 and/or of data 564 and/or the entirety of program provider credential response data 564 and/or any other suitable data that may be used by program provider subsystem 200 to generate a personalized program provider credential for provisioning on device 100. At least user personalization data 572 of program provider registration request data 574 may be encrypted or otherwise signed by device 100 (e.g., by program provider online resource 113) with a program provider key 157 or another shared secret with program provider subsystem 200 such that user personalization data 572 may be securely communicated between device 100 and program provider subsystem 200. Such program provider registration request data 574 may be referred to herein as a personalization sign up request for a program provider credential.

At step 526 of process 500, in response to receiving program provider registration request data 574 at step 524, program provider subsystem 200 may be operative to process program provider registration request data 574 in any suitable manner for generating any suitable customized or personalized program provider credential data 576 that may later be processed by electronic device 100 for provisioning a personalized program provider credential on device 100 for use in future transactions. For example, program provider subsystem 200 may be operative to identify user personalization data 572 of program provider registration request data 574 and may utilize at least a portion of user personalization data 572 to at least partially define a personalized program provider credential (e.g., a personalized program provider loyalty pass) as personalized program provider credential data 576. For example, any suitable API (e.g., any suitable open API) may be utilized between program provider subsystem 200 and device 100 to enable program provider subsystem 200 (e.g., a backend server or system of program provider subsystem 200) to pull information from device 100 (e.g., user personalization data 572 and/or any other suitable information, such as program provider identifier information and/or action identifier information, etc.) in order to generate and then communicate personalized program provider credential data back to device 100 (e.g., for use as a program provider loyalty pass credential). In some embodiments, personalized program provider credential data 576 may be similar to program provider credential response data 564 but may not include a personalization.json file (e.g., personalized program provider credential data 576 may be a "new" version of the program provider credential identified by data 564 but with data indicative of it being customized). Additionally, at step 526 of process 500, in response to receiving program provider registration request data 574 at step 524, program provider subsystem 200 may be operative to process program provider registration request data 574 in any suitable manner for generating any suitable signed tracking data 568' that may later be processed by administration entity subsystem 400 for validating the identity of program provider subsystem 200 that signed such tracking data. For example, program provider subsystem 200 may be operative to identify tracking data 568 of program provider registration request data 574 and may then sign at least tracking data 568 with any suitable key as signed tracking data 568'. Program provider subsystem 200 may identify such a suitable key by identifying a program provider identifier 167 that may be associated with the program provider credential being customized (e.g., by identifying any program provider identifier data of program provider registration request data 574) and then identifying any suitable program provider key 157 that may be associated with that identified program provider identifier 167 (e.g., by identifying any suitable program provider key 157 accessible to program provider subsystem 200 that may be stored against the identified program provider identifier 167, where such an association between program provider key 157 and program provider identifier 167 may have been done at step 502 such that the association may also be independently accessible to administration entity subsystem 400 (e.g., at step 534)). Therefore, at step 526, program provider subsystem 200 may identify tracking data 568, may identify program provider key 157 that has been associated (e.g., at step 502) with a program provider identifier of the program provider credential being personalized, and may then sign or otherwise encrypt tracking data 568 with program provider key 157 as signed tracking data 568'. Program provider subsystem 200 may be operative to take any additional actions at step 526, such as sending a user of device 100 a welcome e-mail associated with the personalized program provider credential, generating a loyalty account on program provider server 210 that may be operative to track and/or update and/or otherwise utilize data from the personalized program provider credential when received from device 100 during a future transaction (e.g., at step 540), and/or the like. In some embodiments, program provider registration request data 574 may include action identifier data and/or account identifier data from data 560 and/or from data 564, and such action identifier data and/or account identifier data may be used by program provider subsystem 200 (e.g., along with user personalization data 572) to determine what custom data 576 may be generated at step 526. For example, in a tap to provision use case when an NFC-tagged loyalty card may be tapped by device 100 at step 508, data 560 and/or data 564 may then be received by device 100 from the NFC-tagged loyalty card that may be indicative of action identifier data and account identifier data, where such action identifier data may be data indicative of a "request to provision a loyalty program provider credential" and such account identifier data may be data indicative of a particular account number of the loyalty card, and program provider subsystem 200 may receive such action identifier data and account identifier data as at least a portion of data 574 (e.g., along with user personalization data 572) for use at step 526 to define custom data 576 accordingly (e.g., to define program provider credential data that may enable provisioning of a digital program provider loyalty account card on device 100 that may be associated with and/or used in place of the NFC-tagged loyalty card that was tapped). As another example, in a use case where a user doesn't have an existing loyalty account, data 560 and/or data 564 may be received by device 100 that may be indicative of action identifier data but no account identifier data, where such action identifier data may be data indicative of a "request to create a new loyalty program provider credential", and program provider subsystem 200 may receive such action identifier data as at least a portion of data 574 (e.g., along with user personalization data 572) for use at step 526 to define custom data 576 accordingly (e.g., to define program provider credential data that may enable provisioning of a digital program provider loyalty account card on device 100 that may be associated with a new user account with program provider subsystem 200, where program provider subsystem 200 may also generate and ship an associated physical program provider loyalty card to the user of device 100 that may be associated with and/or used in place of the provisioned digital program provider loyalty account credential on device 100).

In response to program provider subsystem 200 generating personalized program provider credential data 576 and generating signed tracking data 568' at step 526, program provider subsystem 200 may be operative to communicate such signed tracking data 568' and such personalized program provider credential data 576 as at least a portion of program provider registration response data 578 to electronic device 100 at step 528 (e.g., via communications path 15 from program provider server 210 or as a contactless proximity-based communication 5 from program provider terminal 220, using any suitable communications protocol(s)). Such program provider registration response data 578 may include any other suitable data in addition to personalized program provider credential data 576 and signed tracking data 568', including, but not limited to, the program provider identifier data of the program provider credential (e.g., the program provider identifier of program provider credential response data 564 and/or of program provider validation response data 570 and/or as identified or determined by program provider subsystem 200 at step 526) and/or any other suitable data that may be used by device 100 to securely and/or efficiently and/or otherwise provision a personalized program provider credential on device 100 for use in future transactions. Alternatively, if, for whatever reason, program provider subsystem 200 does not generate personalized program provider credential data 576 at step 526, program provider subsystem 200 may still be operative to communicate program provider registration response data 578 at step 528 that may include any suitable data other than personalized program provider credential data 576, such as signed tracking data 568'. In some embodiments, two iterations of steps 524-528 may occur. In a first iteration, step 526 may generate signed tracking data 568' and return signed tracking data 568' as at least a portion of response data 578 in the first iteration of step 528. Then, in response to receiving such signed tracking data 568', device 100 may generate and communicate other request data 574 at a second iteration of step 524 that may include a request for a personalized pass and, in response, at a second iteration of step 526, program provider subsystem 200 may generate custom data 576 and communicate such custom data 576 as at least a portion of response data 578 in the second iteration of step 528. Communicating signed tracking data 568' and custom data 576 as different iterations of response data 578 at two iterations of step 528 may enable simple payloads to be communicated by program provider subsystem 200 to device 100 as opposed to signed tracking data 568' and custom data 576 being communicated as a combined payload.

At step 530 of process 500, in response to receiving any suitable program provider registration response data 578 at step 528, electronic device 100 may be operative to process at least a portion of such received program provider registration response data 578. If such processing satisfies any suitable condition, such as a condition that requires suitable personalized program provider credential data 576 be identified in received program provider registration response data 578 and/or any suitable validation checks to be passed, then electronic device 100 may store such suitable personalized program provider credential data 576 on device 100 at step 530 (e.g., in memory 104 as customized program provider credential data) and may then proceed to step 532. In some embodiments, if custom data 576 or any other suitable data of response data 578 includes user personalization data from program provider subsystem 200, device 100 may be operative to compare such user personalization data from program provider subsystem 200 with user personalization data 572 of step 522 in order to confirm that the personalization data from program provider subsystem 200 is accurate for the customized program provider credential. For example, if appropriate personalized program provider credential data 576 is identified by device 100 in program provider registration response data 578 at step 530, device 100 may provision a personalized program provider credential on device 100 at step 530 using such personalized program provider credential data 576 (e.g., on secure element 145 as at least a portion or all of a program provider credential SSD 154a that may include a program provider credential applet 153a with program provider credential information 161a and/or in memory component 104 not on secure element 145). Such provisioning of step 530 may fully provision the personalized program provider credential on device 100 (e.g., accessible via use of a credential management application 103 or program provider online resource application 113 or otherwise) for immediate use by device 100 in any suitable transaction (e.g., with program provider subsystem 200). Alternatively, such provisioning of step 530 may not fully provision the personalized program provider credential on device 100 for immediate use by device 100 (e.g., not until additional data may be received by device 100 (e.g., data 586 of step 536)). Provisioning of the personalized program provider credential may include updating a generic credential (e.g., of data 564) with custom data 576 and/or may include adding a totally new personalized credential to device 100 (e.g., with or without deleting the generic credential).

At step 532 of process 500, after step 528 and before, after, or concurrently with step 530, electronic device 100 may be operative to identify signed tracking data 568' from received program provider registration response data 578 and may be operative to communicate such signed tracking data 568' as at least a portion of device registration notification data 582 to administration entity subsystem 400 (e.g., via communications path 25, using any suitable communications protocol(s)). Such device registration notification data 582 may include any other suitable data in addition to signed tracking data 568', including, but not limited to, program provider identifier data associated with the program provider credential of process 500 (e.g., a program provider identifier 167 of program provider credential response data 564 and/or of program provider validation response data 570 and/or of program provider registration response data 578, and/or the signature of signed tracking data 568' may contain a public certificate that may be operative to enable administration entity subsystem 400 to validate the signature of signed tracking data 568') and/or any other suitable data that may be received and then used by administration entity subsystem 400 to further validate the program provider credential of the validation session (e.g., at step 534) and/or to further secure and/or track the personalization of the program provider credential on device 100. In some embodiments, such device registration notification data 582 may not include any portion of user personalization data 572 such that user personalization data of the program provider credential may not be shared with administration entity subsystem 400. Such device registration notification data 582 may be referred to herein as a sign-up notification.

At step 534 of process 500, in response to receiving device registration notification data 582 at step 532, administration entity subsystem 400 (e.g., SMP broker component 440) may be operative to process device registration notification data 582 in any suitable manner for further validating the program provider credential of the validation session (e.g., of any suitable iteration of one, some, or all of steps 514-538). For example, administration entity subsystem 400 may be operative to identify any suitable program provider identifier data of received device registration notification data 582 (e.g., a program provider identifier 167 associated with the program provider credential of the validation session) and may attempt to re-validate the program provider credential identified by the program provider identifier data of the device registration notification data 582. For example, at step 534, administration entity subsystem 400 may be operative to attempt to confirm that the program provider credential identified by a program provider identifier 167 of received device registration notification data 582 is a valid and registered program provider credential at administration entity subsystem 400, which may be confirmed by identifying that program provider identifier 167 in table 430 (e.g., to determine that the program provider identifier 167 has been previously registered with administration entity subsystem 400 (e.g., at step 502) for the program provider credential and that such registration of the program provider credential is still valid (e.g., that administration entity subsystem 400 has not removed program provider identifier 167 from table 430 or has not flagged program provider identifier 167 in table 430 due to its program provider credential being suspicious or otherwise no longer trusted and/or that a certificate associated with the program provider identifier 167 (e.g., in table 430) is still valid)). Additionally or alternatively, validation of step 534 may include administration entity subsystem 400 attempting to confirm that the program provider credential identified by a program provider identifier 167 of received device registration notification data 582 is a valid and registered program provider credential at administration entity subsystem 400 as a customizable program provider credential, which may be confirmed by identifying that program provider identifier 167 in table 430 is associated with a customizable registered credential (e.g., to determine that the program provider identifier 167 has been previously registered with administration entity subsystem 400 (e.g., at step 502) for the program provider credential and that such registration of the program provider credential is still valid and that such registration is indicative of a program provider credential that may be personalized (e.g., at step 502, registration of a program provider credential to be personalized may include administration entity subsystem 400 validating that the program provider credential may be used for personalization purposes in any suitable manner and then whitelisting that program provider credential's program provider identifier as being customizable (e.g., in table 430))). Therefore, such validation of program provider identifier data of device registration notification data 582 at step 534 may be similar in one, some, or all ways to validation of program provider identifier data of program provider validation request data 566 at step 518.

Additionally or alternatively, at step 534 of process 500, in response to receiving device registration notification data 582 at step 532, administration entity subsystem 400 (e.g., SMP broker component 440) may be operative to process device registration notification data 582 in any suitable manner for validating the program provider subsystem 200 that generated program provider registration response data 578. For example, administration entity subsystem 400 may be operative to identify signed tracking data 568' of received device registration notification data 582 as well as a program provider identifier 167 of received device registration notification data 582 and may attempt to validate that signed tracking data 568' with that program provider identifier 167 and any data accessible to administration entity subsystem 400 (e.g., registration data of step 502 and/or tracking data of step 518). For example, at step 534, administration entity subsystem 400 may be operative to identify a program provider key (e.g., program provider key 157) associated with a program provider identifier 167 that may have been identified in device registration notification data 582 (e.g., by identifying a program provider key 157 that may be stored against that program provider identifier 167 (e.g., in table 430, as may have been stored at step 502)), and then administration entity subsystem 400 may attempt to unsign or decrypt signed tracking data 568' of received device registration notification data 582 using that identified program provider key 157. The signature of signed tracking data 568' may contain a public certificate that may be operative to enable administration entity subsystem 400 to validate the signature of signed tracking data 568' and/or otherwise to unsign signed tracking data 568'. Then, if successfully unsigned, then the resulting unsigned tracking data 568 may be used by administration entity subsystem 400 at step 534 to confirm that such unsigned tracking data 568 as derived from device registration notification data 582 is also currently stored at administration entity subsystem 400, or, more particularly, in some embodiments, to confirm that such unsigned tracking data 568 as derived from device registration notification data 582 is also currently stored at administration entity subsystem 400 (e.g., in table 430) against any suitable program provider identifier data of received device registration notification data 582 (e.g., the same program provider identifier 167 used to identify the program provider key for use in unsigning signed tracking data 568' or any other program provider identifier 167), where such a stored association may have been previously made at step 518 by administration entity subsystem 400. In some embodiments, such a stored link between unsigned tracking data 568 and any suitable program provider identifier data may be maintained for only a limited amount of time before the link is automatically cleared, such that electronic device 100 may be limited to a certain duration of time within which it must receive unsigned tracking data 568 of program provider validation response data 570 at step 520 from administration entity subsystem 400 and then eventually send device registration notification data 582 with signed tracking data 568' at step 532 to administration entity subsystem 400 for enabling administration entity subsystem 400 to validate notification data 582 at step 534 (e.g., administration entity subsystem 400 may be operative to remove such an association between unsigned tracking data 568 and any suitable program provider identifier data at administration entity subsystem 400 after a certain period of time (e.g., remove the link from table 430 no more than 10 minutes after the link is created or the link may be configured to auto-delete after a defined period of time)). Therefore, validation of received device registration notification data 582 at step 534 may include administration entity subsystem 400 validating a program provider credential associated with a program provider identifier of received device registration notification data 582 (e.g., using stored data from step 502 or otherwise) and/or unsigning signed tracking data 568' of received device registration notification data 582 (e.g., with a program provider key 157 that may be identified using a program provider identifier of received device registration notification data 582 in combination with stored data from step 502 or otherwise) and validating unsigned tracking data 568 derived from received device registration notification data 582 (e.g., using stored data from step 518 or otherwise), which may ensure that there is a pending program provider credential verification process for that tracking data. Such validation may prevent a fake program provider or a program provider that has not been preapproved by administration entity subsystem 400 (e.g., at step 502) from carrying out personalization of credentials. In some embodiments, rather than administration entity subsystem 400 passing tracking data 568 to program provider subsystem 200 (e.g., via device 100) for signature by program provider subsystem 200 as signed tracking data 568' that may then be passed back to administration entity subsystem 400 (e.g., via device 100) for validation by administration entity subsystem 400, process 500 may include administration entity subsystem 400 generating tracking data 568, storing such tracking data 568 against an appropriate program provider identifier associated with the program provider credential, but then also signing tracking data 568 as signed tracking data 568' with an appropriate program provider key 157 associated with the program provider credential before sending such signed tracking data 568' to device 100 as at least a portion of data 570 (e.g., at steps 518 and 520), and then program provider subsystem 200 receiving such signed tracking data 568' from device 100 as at least a portion of data 574 (e.g., at step 524) and unsigning signed tracking data 568' as tracking data 568 using an appropriate program provider key 157 before then sharing such tracking data 568 with device 100 as at least a portion of data 578 (e.g., at step 528), and then administration entity subsystem 400 may receive that tracking data 568 from device 100 as at least a portion of data 582 (e.g., at step 532) and administration entity subsystem 400 may then validate that such tracking data 568 is currently stored against a program provider identifier associated with the program provider credential for validating the program provider (e.g., at step 534).

In response to administration entity subsystem 400 validating received device registration notification data 582 at step 534, administration entity subsystem 400 may be operative to communicate any suitable device registration response data 586 to electronic device 100 at step 536 that may be indicative of such validation (e.g., via communications path 25 using any suitable communications protocol(s)). Such device registration response data 586 may include any suitable data, including, but not limited to, data confirming the validation of step 534 or data indicating that no validation was achieved at step 534 (e.g., if any portion of step 534 were to fail). Such device registration response data 586 may be received at electronic device 100 and processed at step 537 to complete the provisioning of the program provider credential. For example, if device registration response data 586 is indicative of a successful validation at step 534, then device 100 may be operative at step 537 to complete the provisioning of the personalized program provider credential that may have been partially carried out at step 530. However, if such provisioning was completely carried out at step 530, then step 537 may include device 100 confirming such provisioning. Alternatively, if device registration response data 586 is indicative of an unsuccessful validation at step 534, then device 100 may be operative at step 537 to undo or cancel or delete a partial or complete provisioning of the personalized program provider credential that may have been carried out at step 530. Therefore, in response to receiving such device registration response data 586, device 100 may confirm or complete or cancel a potential provisioning of a program provider credential on device 100 at step 537 and may provide any suitable confirmation data to a user of device 100, such as with confirmation data 331 of screen 190d of FIG. 3D. Once a program provider credential (e.g., a generic or personalized program provider credential) is successfully provisioned on device 100, that program provider credential (e.g., at least a portion of customized or personalized program provider credential data 576) may be communicated as at least a portion of device transaction data 590 from electronic device 100 to program provider subsystem 200 (e.g., as an online communication via communications path 15 to program provider server 210 or as a contactless proximity-based communication 5 to program provider terminal 220, using any suitable communications protocol(s)) at step 540 for use in any suitable transaction with program provider subsystem 200.

Moreover, in response to administration entity subsystem 400 validating or not validating received device registration notification data 582 at step 534 and sending applicable device registration response data 586 to device 100, administration entity subsystem 400 may be operative at step 538 to update any suitable program provider pass data 588 at administration entity subsystem 400 (e.g., in table 430 or any other suitable data structure of administration entity subsystem 400), where such program provider pass data 588 may be indicative of any suitable information with respect to one or more successful and/or unsuccessful validations of program provider credential data. Such program provider pass data 588 may be operative to track the success rate of generic program provider credentials being converted into personalized program provider credentials (e.g., with an iteration of steps 515-536) for all program provider subsystems and/or for particular program provider subsystems and/or for particular program provider credential types, where such program provider pass data 588 may be used for any suitable purpose using any suitable program provider identifier data of notification data 582 and/or of request data 566. Such tracking with program provider pass data 588 may enable the gathering of any suitable metrics for any suitable purposes. For example, program provider pass data 588 may provide accurate data resolution for enabling a managing entity of administration entity subsystem 400 to track conversions of program provider credentials on user devices and to charge any suitable fee (e.g., to a program provider subsystem) for enabling such conversions in a secure and efficient manner. Therefore, process 500 may enable administration entity subsystem 400 to securely enable and accurately track the number of program provider credentials that may be personalized on devices 100, despite potentially supporting an open API with one or more program provider subsystems 200. Tracking data 568 may be used by administration entity subsystem 400 in process 500 to account for any suitable events, including, but not limited to, each option event provided to each device 100 to personalize a program provider credential (e.g., if screen 190*b* may only be provided after generation and sharing of tracking data 568 with device 100), each personalization event (e.g., every time signed tracking data is returned to administration entity subsystem 400), and/or the like.

It is understood that the steps shown in process 500 of FIG. 5 are only illustrative and that existing steps may be modified or omitted, additional steps may be added, and the order of certain steps may be altered. It is to be understood that if any validation step of process 500 were to fail, such failure may be communicated to one or more suitable entities. For example, if the validation of program provider validation request data 566 were to fail at step 518 and/or if the validation of device registration notification data 582 were to fail at step 534, such failure may be shared by administration entity subsystem 400 with program provider subsystem 200 and/or with electronic device 100 so that device 100 may cancel provisioning of any associated program provider credential and/or potentially remove any associated program provider online resource from device 100. After a user of device 100 may interact with device 100 in any suitable manner to carry out step 508, steps 510-520 may occur transparent to that user (e.g., steps 510-520 may occur without any further user interaction with device 100 and may seem instantaneous to a user of device 100, for example, until device 100 may seek user permission to personalize a program provider credential (e.g., with screen 190*b* of FIG. 3B)). Additionally or alternatively, once a user of device 100 has provided permission to personalize a program provider credential (e.g., via interaction with screen 190*b* of FIG. 3B, for example, at step 515 or step 522), any remaining steps of process 500 may occur transparent to that user (e.g., steps 516-537 may occur without any further user interaction with device 100 and may seem instantaneous to a user of device 100 after a user provides permission to personalize a program provider credential at step 515 and/or steps 524-537 may occur without any further user interaction with device 100 and may seem instantaneous to a user of device 100 after a user provides permission to personalize a program provider credential at step 522). Alternatively, in some embodiments, process 500 may occur altogether transparent to a user of device 100 (e.g., where device 100 may be configured to automatically determine when a program provider credential has been received that may be personalized and to automatically provide appropriate personal information at step 522 if a program provider has been properly validated at step 518).

In some embodiments, steps 532-538 may be skipped, and validation of validation request data 566 at step 518 may be sufficient without additional validation at step 534, where, in such embodiments, tracking data 568 may or may not be generated and/or communicated. In some embodiments, tracking data 568 (e.g., a nonce) may be long enough (e.g., a string of data of a suitable length, such as 10 or more characters) to provide enough randomness for enabling a significantly robust challenge to program provider subsystem 200 or may be short enough (e.g., 6 characters) to provide enough randomness for enabling a somewhat robust challenge while also satisfying any suitable standard (e.g., to satisfy a data length requirement of the Europay MasterCard Visa ("EMV") standard) if tracking data 568 may be communicated between device 100 and program provider subsystem 200 as a contactless proximity-based communication 5.

Therefore, a program provider or any other suitable vendor may be operative to push a generic loyalty card or other suitable generic program provider credential to a customer device (e.g., as part of a contactless proximity-based transaction) and a user may be operative to add such a generic program provider credential to a digital wallet of the device (e.g., with option 309) and/or personalize such a generic program provider credential (e.g., with option 315) at any suitable moment (e.g., before or after the generic program provider credential is added to a digital wallet for anonymous use).

In some embodiments, a device application, such as a credential management application 103, may be operative to carry out each one of the steps of process 500 that may occur at device 100 and/or may be operative to provide one or more GUIs (e.g., one or more of screens 190-190*d* of FIGS. 3-3D) or otherwise present information to a user of device 100 during process 500. Alternatively, in some embodiments, any suitable program provider online resource or application 113 that may be associated with a program provider subsystem 200 provisioning the program provider credential on device 100 may be operative to carry out one or more steps of process 500 that may occur at device 100 and/or may be operative to provide one or more GUIs (e.g., one or more of screens 190-190*d* of FIGS. 3-3D) or otherwise present information to a user of device 100 during process 500. For example, at step 522, in response to determining that a program provider credential on device 100 may be personalized (e.g., in response to receiving suitable data 570 at step 520), a credential management application 103 or any other suitable device application of device 100 may be operative to initiate a launch (e.g., a deep-link launch) of a program provider online resource available to device 100 that may be associated with that program provider credential (e.g., a program provider online resource that may be associated with a program provider identifier of the program provider credential) or, if such a program provider online resource is not available on device 100, to launch an application store application on device 100 that may facilitate such a program provider online resource being provisioned on device 100 (e.g., with a provisioning step similar to step 506). Then, once such a program provider online resource has been launched on device 100, the device application or any other suitable processing capability of device 100 may be operative to enable user personalization data 572 to be collected by or shared with that program provider online resource. Then, the program provider online resource on device 100 may be operative to communicate with program provider subsystem 200 at steps 524 and 528 for creating a personalized program provider credential and/or the program provider online resource on device 100 may be operative to communicate with a credential management application 103 at step 530 and/or step 537 for provisioning a program provider credential on device 100. In some embodiments, such a launch of a program provider online resource may occur after data 560 may be received by device 100 at step 510 or after data 564 is received by device 100 at step 514 such that a user may interface directly with a program provider online resource at an earlier phase of process 500. Therefore, rather than using an open API, a program provider online resource may be utilized on device 100 to at least partially define the manner in which data may be collected at device 100 and/or in which data may be communicated between device 100 and program provider subsystem 200 for enabling communicate personalized program provider credential data to be provisioned on device 100 (e.g., for use as a program provider private label account pass credential and/or program provider reloadable prepaid account pass credential and/or program provider gift card credential and/or the like).

When device 100 may be communicating with program provider subsystem 200 via a native application on device 100 that may be specific to the program provider, then program provider application 113 may be provided by such an application. However, when device 100 may be communicating with program provider subsystem 200 via an internet browser application or hybrid application that may or may not be not specific to a program provider but that may be pointed to a website managed by a program provider (e.g., on a server under the control of the program provider), then program provider application 113 may be a layout engine software component (e.g., WebKit) that may forward communications on to a website of the program provider (e.g., via communications component 106). For example, such an application 113 of device 100 may be a conduit for any device transaction data to be provided to program provider subsystem 200.

Figure 6:
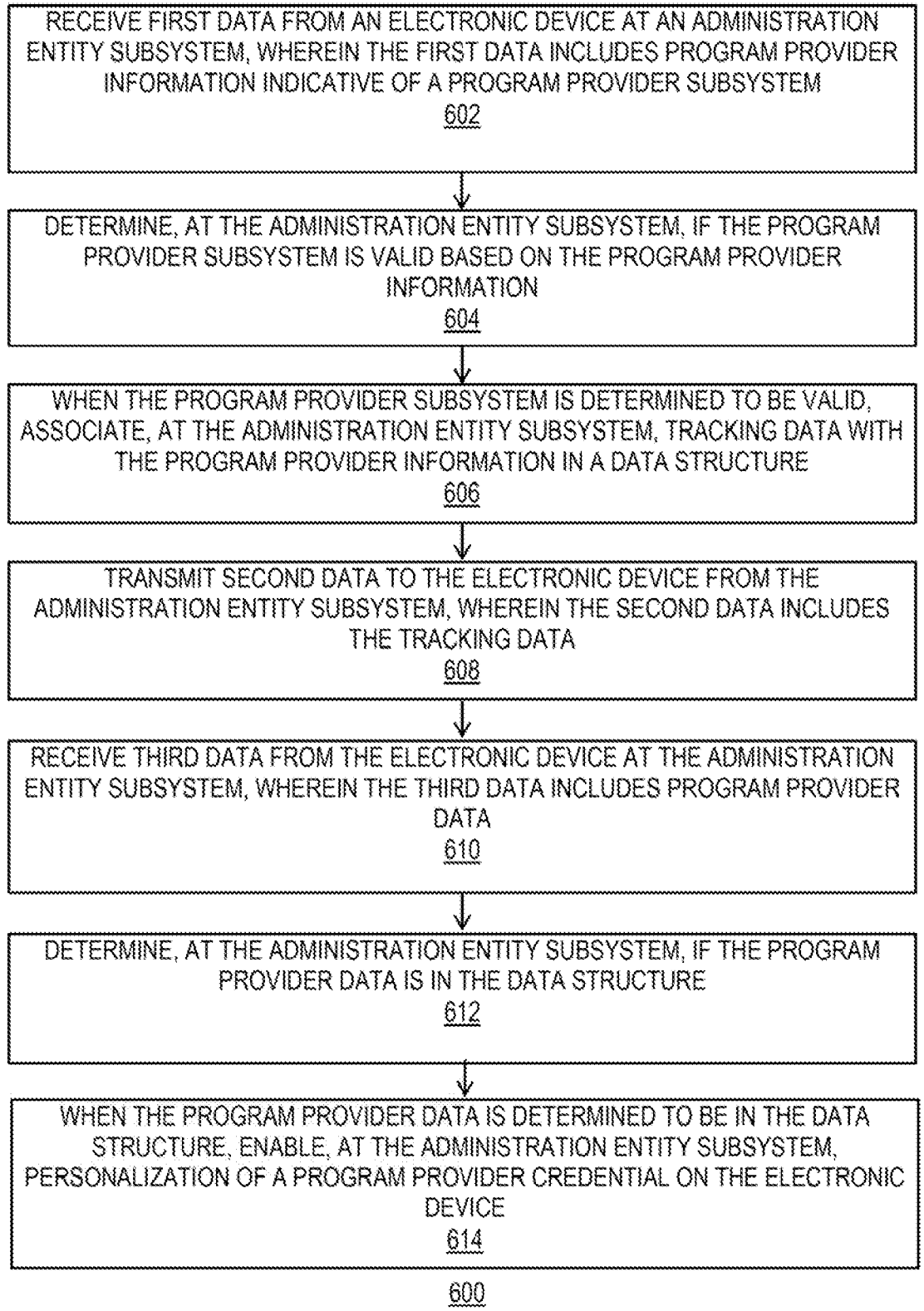

Description of FIG. 6

FIG. 6 is a flowchart of an illustrative process 600 for personalizing a program provider credential. At step 602 of process 600, an administration entity subsystem may receive first data from an electronic device, wherein the first data includes program provider information indicative of a program provider subsystem (e.g., administration entity subsystem 400 may receive from electronic device 100 program provider validation request data 566 that may include program provider information indicative of program provider subsystem 200). At step 604 of process 600, the administration entity subsystem may determine if the program provider subsystem is valid based on the program provider information (e.g., administration entity subsystem 400 may determine if program provider subsystem 200 is valid based on program provider identification information of program provider validation request data 566). At step 606 of process 600, the administration entity subsystem may associate tracking data with the program provider information in a data structure when the program provider subsystem is determined to be valid (e.g., administration entity subsystem 400 may generate tracking data 568 and store such tracking data against program provider identifier data when program provider subsystem 200 is validated). At step 608 of process 600, the administration entity subsystem may transmit second data to the electronic device, wherein the second data includes the tracking data (e.g., administration entity subsystem 400 may communicate program provider validation response data 570 with tracking data 568 to electronic device 100). At step 610 of process 600, after transmitting the second data, the administration entity subsystem may receive third data from the electronic device, wherein the third data includes program provider data (e.g., administration entity subsystem 400 may receive device registration notification data 582 with signed tracking data 568'). At step 612 of process 600 the administration entity subsystem may determine if the program provider data is in the data structure (e.g., administration entity subsystem 400 may validate notification data 582 by determining if signed tracking data 568' may be unsigned and found in the data structure (e.g., as previously stored during validation of a program provider)). At step 614 of process 600, when the program provider data is determined to be in the data structure the administration entity subsystem may enable personalization of a program provider credential on the electronic device (e.g., administration entity subsystem 400 may communicate device registration response data 586 to electronic device 100 for enabling completion of program provider credential provisioning on device 100).

It is understood that the steps shown in process 600 of FIG. 6 are only illustrative and that existing steps may be modified or omitted, additional steps may be added, and the order of certain steps may be altered.

Figure 7:
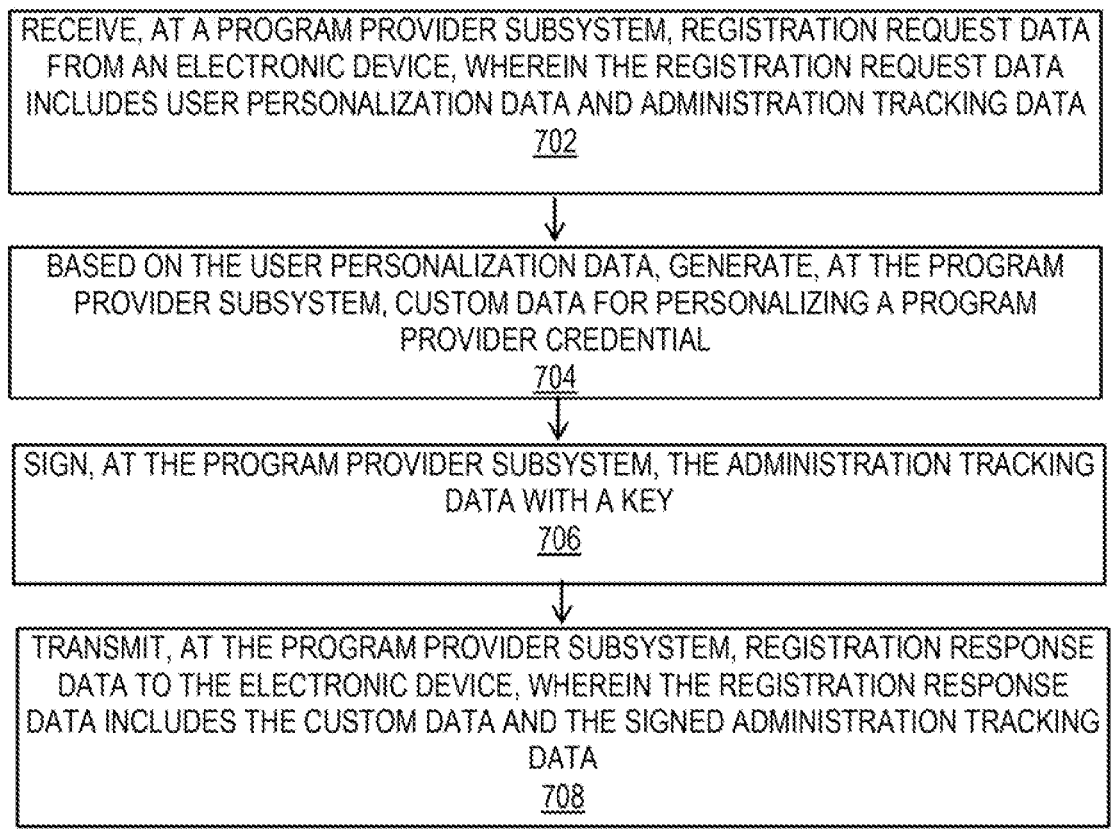

Description of FIG. 7

FIG. 7 is a flowchart of an illustrative process 700 for personalizing a program provider credential. At step 702 of process 700, a program provider subsystem may receive registration request data from an electronic device, wherein the registration request data includes user personalization data and administration tracking data (e.g., program provider subsystem 200 may receive registration request data 574 with tracking data 568 and personalization data 572 from electronic device 100). At step 704 of process 700, based on the user personalization data, the program provider subsystem may generate custom data for personalizing a program provider credential (e.g., program provider subsystem 200 may create custom data 576). At step 706 of process 700, the program provider subsystem may sign the administration tracking data with a key (e.g., program provider subsystem 200 may sign tracking data 568 as signed tracking data 568'). At step 708 of process 700, the program provider subsystem may transmit registration response data to the electronic device, wherein the registration response data includes the custom data and the signed administration tracking data (e.g., program provider subsystem 200 may communicate program provider registration response data 578 to electronic device 100 with custom data 576 and signed tracking data 568').

It is understood that the steps shown in process 700 of FIG. 7 are only illustrative and that existing steps may be modified or omitted, additional steps may be added, and the order of certain steps may be altered.

Figure 8:
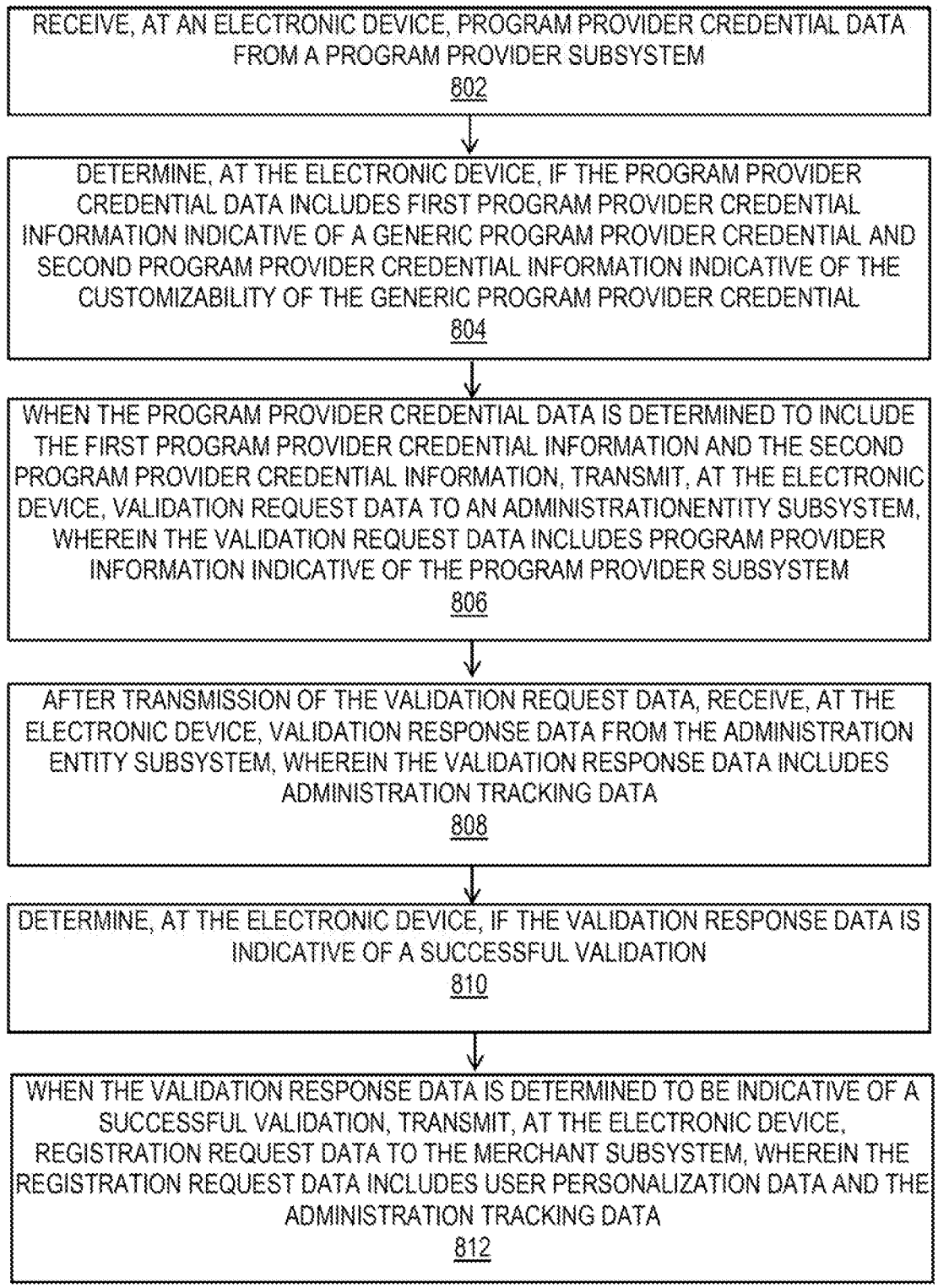

Description of FIG. 8

FIG. 8 is a flowchart of an illustrative process 800 for personalizing a program provider credential. At step 802 of process 800, an electronic device may receive program provider credential data from a program provider subsystem (e.g., device 100 may receive credential response data 564 from program provider subsystem 200). At step 804 of process 800, the electronic device may determine if the program provider credential data includes first program provider credential information indicative of a generic program provider credential and second program provider credential information indicative of the customizability of the generic program provider credential (e.g., electronic device 100 may determine whether credential response data 564 is indicative of an ability to customize a generic program provider credential). At step 806 of process 800, when the program provider credential data is determined to include the first program provider credential information and the second program provider credential information, the electronic device may transmit validation request data to an administration entity subsystem, wherein the validation request data includes program provider information indicative of the program provider subsystem (e.g., device 100 may communicate program provider validation request data 566 with information indicative of program provider subsystem 200 to administration entity subsystem 400). At step 808 of process 800, after transmission of the validation request data, the electronic device may receive validation response data from the administration entity subsystem, wherein the validation response data includes administration tracking data (e.g., device 100 may receive program provider validation response data 570 with tracking data 568 from administration entity subsystem 400). At step 810 of process 800, the electronic device may determine if the validation response data is indicative of a successful validation (e.g., device 100 may analyze program provider validation response data 570 to determine if it is indicative of a successful validation of program provider subsystem 200 by administration entity subsystem 400). At step 812 of process 800, when the validation response data is determined to be indicative of a successful validation, the electronic device may transmit registration request data to the program provider subsystem, wherein the registration request data includes user personalization data and the administration tracking data (e.g., device 100 may transmit registration request data 574 with tracking data 568 and personalization data 572 to program provider subsystem 200).

It is understood that the steps shown in process 800 of FIG. 8 are only illustrative and that existing steps may be modified or omitted, additional steps may be added, and the order of certain steps may be altered.

As mentioned, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic or commercial appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, modem, router, printer, or any combination thereof. In some embodiments, electronic device 100 may perform a single function (e.g., a device dedicated to conducting secure data transactions) and, in other embodiments, electronic device 100 may perform multiple functions (e.g., a device that conducts secure data transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Communications component 106 may be referred to as an online communications component when operative to communicate any suitable data to any remote server or other suitable entity (e.g., to any suitable internet connection). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and program provider subsystem 200 (e.g., program provider payment terminal 220). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively, or additionally, NFC component 120 may allow for close range communication at relatively high data rates (e.g., 370 Mbps), and may comply with any suitable standards, such as the TransferJet™ protocol. Communication between NFC component 120 and program provider subsystem 200 may occur within any suitable close range distance between the NFC component and program provider subsystem 200 (see, e.g., distance D of FIG. 1 between NFC component 120 and program provider payment terminal 220), such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. Such an NFC component may provide a manner of acquiring merchandise information, transferring payment information, and otherwise communicating with an external device (e.g., communicating between NFC component 120 and program provider terminal 220).

NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively, or additionally, at least a portion of secure element 145 may be provided in an integrated circuit that may be embedded into electronic device 100 during manufacturing of device 100. Alternatively, or additionally, at least a portion of secure element 145 may be provided in a peripheral device that can be plugged into, inserted into, or otherwise coupled to electronic device 100, such as a micro secure digital ("SD") memory card.

Program provider terminal 220 of program provider subsystem 200 of FIG. 1 may include a reader for detecting, reading, or otherwise receiving an NFC communication from electronic device 100 (e.g., communication 5 when device 100 comes within a certain distance or proximity of program provider terminal 220). Accordingly, it is noted that an NFC communication between such a program provider terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a program provider terminal. For instance, a reader of such a program provider terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information from NFC data module 132, via antenna 116 or antenna 134, to such a program provider terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information from NFC data module 132, via antenna 116 or antenna 134, to program provider terminal 220 as an NFC communication, rather than reflect radio frequency signals, as in the case of a passive NFC device module 130. Program provider terminal 220 may be provided by a program provider of program provider subsystem 200 (e.g., in a store of the program provider for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication between electronic device 100 and such a program provider terminal. For example, NFC component 120 may be configured to provide any suitable short-range communication, such as those involving electromagnetic/electrostatic coupling technologies. Alternatively, in some embodiments, NFC component 120 of device 100 may be configured to include any suitable components for enabling data available to processor 102 or any other part of device 100 to be communicated as any suitable contactless proximity-based communication 5 between NFC component 120 of device 100 and program provider terminal 220 of program provider subsystem 200, but NFC component 120 may or may not include a secure element operative to securely store credential applets.

One, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

While there have been described systems, methods, and computer-readable media for personalizing program provider credentials on an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:
1. A method comprising:
   at an administration entity subsystem:
      receiving first data from an electronic device, wherein the first data comprises program provider information indicative of a program provider subsystem;
      determining that the program provider subsystem is valid based on the program provider information;
      in response to determining that the program provider subsystem is valid, associating tracking data with the program provider information in a data structure;
      transmitting second data to the electronic device, wherein the second data comprises the tracking data;
      receiving third data from the electronic device, wherein the third data comprises program provider data;
      determining that the program provider data is in the data structure; and in response to determining that the program provider data is in the data structure, enabling personalization of a program provider credential on the electronic device.

2. The method of claim 1, wherein:
prior to determining that the program provider data is in the data structure, the method further comprises, at the administration entity subsystem, identifying a program provider key;
prior to determining that the program provider data is in the data structure, the method further comprises, at the administration entity subsystem, unsigning the program provider data with the identified program provider key;
determining that the program provider data is in the data structure comprises determining that the unsigned program provider data is in the data structure; and
the enabling comprises enabling the personalization of the program provider credential on the electronic device.

3. The method of claim 2, wherein the identifying the program provider key comprises identifying the program provider key based on the program provider information.

4. The method of claim 2, wherein:
the third data further comprises other program provider information indicative of the program provider subsystem; and
the identifying the program provider key comprises identifying the program provider key based on the other program provider information.

5. The method of claim 2, further comprising, at the administration entity subsystem, prior to receiving the first data from the electronic device, sharing the program provider key with the program provider subsystem.

6. The method of claim 2, wherein the program provider key is not accessible by the electronic device.

7. The method of claim 2, wherein the determining that the unsigned program provider data is in the data structure comprises determining that the unsigned program provider data is associated with the program provider information in the data structure.

8. The method of claim 7, wherein the unsigned program provider data is the tracking data.

9. The method of claim 2, wherein:
a signature of the program provider data comprises a certificate; and
the method further comprises, prior to the enabling personalization of the program provider credential, at the administration entity subsystem, validating the signature of the program provider data using the certificate.

10. The method of claim 1, wherein:
prior to transmitting the second data, the method further comprises, at the administration entity subsystem, identifying a program provider key; and
the second data comprises the tracking data signed with the identified program provider key as signed tracking data.

11. The method of claim 10, wherein the identifying the program provider key comprises identifying a merchant key based on merchant information.

12. The method of claim 10, wherein:
the third data further comprises the program provider information indicative of the program provider subsystem; and
the determining that the program provider data is in the data structure comprises determining that the program provider data of the third data is associated in the data structure with the program provider information of the third data.

13. The method of claim 10, further comprising, at the administration entity subsystem, prior to receiving the first data from the electronic device, sharing the program provider key with the program provider subsystem.

14. The method of claim 10, wherein the program provider key is not accessible by the electronic device.

15. The method of claim 10, wherein the determining that the program provider data is in the data structure comprises determining that the program provider data is associated with the program provider information in the data structure.

16. The method of claim 15, wherein the program provider data is the tracking data.

17. The method of claim 1, wherein the enabling comprises transmitting fourth data to the electronic device, wherein the fourth data is operative to complete provisioning of the program provider credential on the electronic device.

18. The method of claim 1, further comprising, based on the enabling, charging the program provider subsystem a fee at the administration entity subsystem.

19. A device comprising:
a memory; and
at least one processor configured to:
receive first data from an electronic device, wherein the first data comprises program provider information indicative of a program provider subsystem;
determine that the program provider subsystem is valid based on the program provider information;
in response to a determination that the program provider subsystem is valid, associate tracking data with the program provider information in a data structure;
transmit second data to the electronic device, wherein the second data comprises the tracking data;
after transmission of the second data, receive third data from the electronic device, wherein the third data comprises signed program provider data;
identify a program provider key;
unsign the program provider data with the identified program provider key;
determine that the unsigned program provider data is associated with the program provider information in the data structure; and
in response to a determination that the unsigned program provider data is associated with the program provider information in the data structure, confirm personalization of a program provider credential on the electronic device.

20. The device of claim 19, wherein the at least one processor is configured to identify the program provider key based on the program provider information.

21. The device of claim 19, wherein:
the third data further comprises other program provider information indicative of the program provider subsystem; and
the at least one processor is configured to identify the program provider key based on the other program provider information.

22. The method of claim 19, wherein the at least one processor is further configured to transmit fourth data to the electronic device, wherein the fourth data is operative to complete provisioning of the program provider credential on the electronic device.

23. The method of claim 19, wherein the at least one processor is further configured to:

prior to receipt of the first data from the electronic device, share the program provider key with the program provider subsystem.

24. The device of claim 19, wherein the program provider key is not accessible by the electronic device.

25. A non-transitory machine-readable medium comprising code that, when executed by one or more processors, causes the one or more processors to perform operations, the code comprising:
- code to receive first data from an electronic device, wherein the first data comprises program provider information indicative of a program provider subsystem;
- code to determine that the program provider subsystem is valid based on the program provider information;
- code to, in response to a determination that the program provider subsystem is valid, associate tracking data with the program provider information in a data structure;
- code to transmit second data to the electronic device, wherein the second data comprises the tracking data;
- code to receive third data from the electronic device, wherein the third data comprises program provider data;
- code to determine that the program provider data is in the data structure; and
- code to, in response to a determination that the program provider data is in the data structure, enable personalization of a program provider credential on the electronic device.

* * * * *